(12) United States Patent
Kang et al.

(10) Patent No.: US 11,729,678 B2
(45) Date of Patent: *Aug. 15, 2023

(54) APPARATUS AND METHOD FOR ALLOCATING RESOURCES FOR SWITCHING BETWEEN MACRO CELL AND SMALL CELL IN WIRELESS COMMUNICATION SYSTEM

(71) Applicant: Samsung Electronics Co., Ltd., Suwon-si (KR)

(72) Inventors: Hyun-Jeong Kang, Seoul (KR); Sun-Heui Ryoo, Yongin-si (KR); Jung-Soo Jung, Seongnam-si (KR); Sang-Wook Kwon, Yongin-si (KR); Jong-Hyung Kwun, Seoul (KR); Suk-Won Kim, Yongin-si (KR); June Hwang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,467

(22) Filed: Jun. 17, 2022

(65) Prior Publication Data

US 2022/0322168 A1    Oct. 6, 2022

Related U.S. Application Data

(63) Continuation of application No. 15/592,632, filed on May 11, 2017, now Pat. No. 11,368,884, which is a
(Continued)

(30) Foreign Application Priority Data

Aug. 26, 2013 (KR) .................. 10-2013-0101206

(51) Int. Cl.
H04W 36/00 (2009.01)
H04W 36/04 (2009.01)
(Continued)

(52) U.S. Cl.
CPC ....... *H04W 36/0072* (2013.01); *H04W 36/04* (2013.01); *H04W 72/21* (2023.01);
(Continued)

(58) Field of Classification Search
CPC ............. H04W 36/0072; H04W 36/04; H04W 72/0413; H04W 72/0426; H04W 74/0833; H04W 72/048; H04W 72/04
See application file for complete search history.

(56) References Cited

U.S. PATENT DOCUMENTS 5,711,003 A    1/1998 Dupuy
2005/0192011 A1    9/2005 Hong et al.
(Continued)

FOREIGN PATENT DOCUMENTS

KR    10-2005-0081324 A    8/2005
KR    10-0627111 B1    9/2006
(Continued)

OTHER PUBLICATIONS

U.S. Appl. No. 61/864,001, "Single-Radio Seamless Handover for GSM", filed Aug. 9, 2013.
(Continued)

*Primary Examiner* — Thinh D Tran
(74) *Attorney, Agent, or Firm* — Jefferson IP Law, LLP

(57) ABSTRACT

The objective of the present invention is to provide services by effectively switching, by a terminal, a macro cell and a small cell on the basis of time in a communication system in which the macro cell and the small cell coexist. A method for operating a terminal in a wireless communication system comprises the steps of: transmitting, to a first base station
(Continued)

and/or a second base station, information on a switching delay time required for the terminal to perform cell switching; and communicating through a resource of the first base station and a resource of the second base station which are allocated by considering the switching delay time.

20 Claims, 27 Drawing Sheets

Related U.S. Application Data continuation of application No. 14/914,973, filed as application No. PCT/KR2014/007947 on Aug. 26, 2014, now Pat. No. 10,244,440.

(51) Int. Cl.
*H04W 74/08* (2009.01)
*H04W 72/21* (2023.01)
*H04W 72/27* (2023.01)
*H04W 72/51* (2023.01)

(52) U.S. Cl.
CPC ....... *H04W 72/27* (2023.01); *H04W 74/0833* (2013.01); *H04W 72/51* (2023.01)

(56) References Cited

U.S. PATENT DOCUMENTS

| | | |
|---|---|---|
| 2008/0316969 A1 | 12/2008 | Prakash et al. |
| 2010/0260088 A1* | 10/2010 | Jeon .................... H04L 12/1877 370/312 |
| 2010/0272065 A1 | 10/2010 | Lee et al. |
| 2011/0103282 A1 | 5/2011 | Jeon et al. |
| 2011/0105141 A1 | 5/2011 | Jung et al. |
| 2011/0217980 A1 | 9/2011 | Faurie et al. |
| 2011/0299614 A1 | 12/2011 | Kim et al. |
| 2011/0312326 A1 | 12/2011 | Kwon et al. |
| 2012/0020327 A1 | 1/2012 | Park et al. |
| 2012/0100803 A1* | 4/2012 | Suumaki ................ H04W 12/03 455/41.1 |
| 2012/0177002 A1* | 7/2012 | Faucher ............ H04W 36/0069 370/331 |
| 2013/0084809 A1 | 4/2013 | Johansson et al. |
| 2013/0242815 A1 | 9/2013 | Wang et al. |
| 2014/0029586 A1 | 1/2014 | Loehr et al. |
| 2014/0198744 A1 | 7/2014 | Wang et al. |
| 2014/0200016 A1 | 7/2014 | Siomina et al. |
| 2015/0003329 A1* | 1/2015 | Morita .................. H04W 24/10 370/328 |
| 2015/0023439 A1 | 1/2015 | Dimou et al. |
| 2015/0304014 A1 | 10/2015 | Sadeghi et al. |
| 2015/0327196 A1 | 11/2015 | Blankenship et al. |
| 2016/0150586 A1 | 5/2016 | Lei et al. |
| 2016/0164622 A1 | 6/2016 | Yi et al. |
| 2016/0198375 A1 | 7/2016 | Sundberg et al. |

FOREIGN PATENT DOCUMENTS

| | | |
|---|---|---|
| KR | 10-2008-0064426 A | 7/2008 |
| KR | 10-2010-0116762 A | 11/2010 |
| WO | 2010/074505 A2 | 7/2010 |
| WO | 2012/041422 A2 | 4/2012 |
| WO | 2012/106798 A1 | 8/2012 |
| WO | 2013/025237 A1 | 2/2013 |

OTHER PUBLICATIONS

U.S. Appl. No. 61/523,694, "Method and Arrangement for Handling Measurements under Dynamically Configured Patterns", filed Aug. 15, 2011.
U.S. Notice of Allowance dated Nov. 2, 2018, issued in U.S. Appl. No. 14/914,973.
Korean Notice of Patent Grant dated Nov. 26, 2019, issued in Korean Patent Application No. 10-2013-0101206.

* cited by examiner

APPARATUS AND METHOD FOR ALLOCATING RESOURCES FOR SWITCHING BETWEEN MACRO CELL AND SMALL CELL IN WIRELESS COMMUNICATION SYSTEM

CROSS-REFERENCE TO RELATED APPLICATION(S)

This application is a continuation application of prior application Ser. No. 15/592,632, filed on May 11, 2017, which has issued as U.S. Pat. No. 11,368,884 on Jun. 21, 2022, which is a continuation application of prior application Ser. No. 14/914,973, filed on Feb. 26, 2016, which has issued as U.S. Pat. No. 10,244,440 on Mar. 26, 2019, which is a U.S. National Stage application under 35 U.S.C. § 371 of an International application number PCT/KR2014/007947, filed on Aug. 26, 2014, which is based on and claims priority of a Korean patent application number 10-2013-0101206, filed on Aug. 26, 2013, in the Korean Intellectual Property Office, the disclosure of which is incorporated by reference herein in its entirety.

TECHNICAL FIELD

The present invention relates to resource allocation in a wireless communication system in which a macro cell and a small cell coexist.

BACKGROUND

Wireless communication systems are in rapid development and, particularly, in recent years, are being developed in a form of supporting a high-speed large-capacity data service in order to satisfy users' various desires. As one way for the high-speed large-capacity data service, installing a small cell as well as an existing macro cell is being taken into consideration.

Commonly, the small cell is installed at a higher frequency band than the macro cell and thus can support a higher data rate than the macro cell. Particularly, in case that the existing macro cell is difficult to support a new service, the small cell supporting the higher data rate is used to support the new service, whereby effective network operation is possible.

In case that the macro cell and the small cell are installed together, it is common that a terminal is serviced only in one cell among the macro cell or the small cell. Hence, further, being serviced from the two cells after forming a connectivity, i.e., a dual connectivity in all of the macro cell and the small cell is being taken into consideration.

SUMMARY

Accordingly, one exemplary embodiment of the present invention provides an apparatus and method for supporting a dual connectivity for a plurality of base stations in a wireless communication system.

Another exemplary embodiment of the present invention provides an apparatus and method for effectively using a resource at dual connectivity in a wireless communication system.

A further exemplary embodiment of the present invention provides an apparatus and method for preventing a conflict between resources at dual connectivity in a wireless communication system.

A yet another exemplary embodiment of the present invention provides an apparatus and method for providing information necessary for resource coordination for resource conflict prevention in a wireless communication system.

A still another exemplary embodiment of the present invention provides an apparatus and method for indicating a scheduling type in a dual connectivity in a wireless communication system.

A still another exemplary embodiment of the present invention provides an apparatus and method for recognizing a resource conflict in a wireless communication system.

A still another exemplary embodiment of the present invention provides an apparatus and method for preventing unnecessary cell switching at dual connectivity in a wireless communication system.

A method for operating a terminal in a wireless communication system according to an exemplary embodiment of the present invention, characterized in that the method includes the steps of transmitting information on a switching delay time required for the terminal to perform cell switching to at least one of a first base station and a second base station, and performing communication through a resource of the first base station and a resource of the second base station which are allocated by considering the switching delay time.

A method for operating a first base station in a wireless communication system according to another exemplary embodiment of the present invention, characterized in that the method includes the steps of receiving information on a switching delay time required for a terminal to perform cell switching between the first base station and a second base station from the terminal, and performing communication with the terminal through a resource which is allocated by considering the switching delay time.

A terminal apparatus in a wireless communication system according to a further exemplary embodiment of the present invention, characterized in that the apparatus includes a transmitter transmitting information on a switching delay time required for the terminal to perform cell switching to at least one of a first base station and a second base station, and a controller controlling to perform communication through a resource of the first base station and a resource of the second base station which are allocated by considering the switching delay time.

A first base station apparatus in a wireless communication system according to a yet another exemplary embodiment of the present invention, characterized in that the apparatus includes a receiver receiving information on a switching delay time required for a terminal to perform cell switching between the first base station and a second base station from the terminal, and a controller controlling to perform communication with the terminal through a resource which is allocated by considering the switching delay time.

Various exemplary embodiments of the present invention make it possible for a terminal to perform a procedure of efficiently switching on the basis of time between a macro cell and a small cell and being serviced in a communication system in which the macro cell and the small cell coexist, thereby dispersing a load of the macro cell to the small cell.

Also, various exemplary embodiments of the present invention may differentiate, according to a switching capability of a terminal, a resource required for the terminal to switch on the basis of time between a macro cell and a small cell and be serviced in a communication system in which the macro cell and the small cell coexist.

Also, various exemplary embodiments of the present invention efficiently control a time-based switching time point between a macro cell and a small cell in a communication system in which the macro cell and the small cell coexist, thereby decreasing power consumption of a terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION

Preferred embodiments of the present invention will be described herein below with reference to the accompanying drawings. In describing the present invention, well-known functions or constructions are not described in detail since they would obscure the invention in unnecessary detail. And, terms described below, which are defined considering functions in the present invention, can be modified in accordance to user and operator's intention or practice. Therefore, the definition should be given on the basis of the content throughout the present specification.

The present invention describes a technology for effectively performing, by a terminal, switching between a macro cell and a small cell in a communication system in which the macro cell and the small cell coexist.

For description's convenience below, the present invention uses some of the terms and names defined in the 3GPP LTE (3rd Generation Partnership Project Long Term Evolution) standard. However, the present invention is not limited to the terms and names, and may be identically applied even to systems following other standards.

Figure 1:
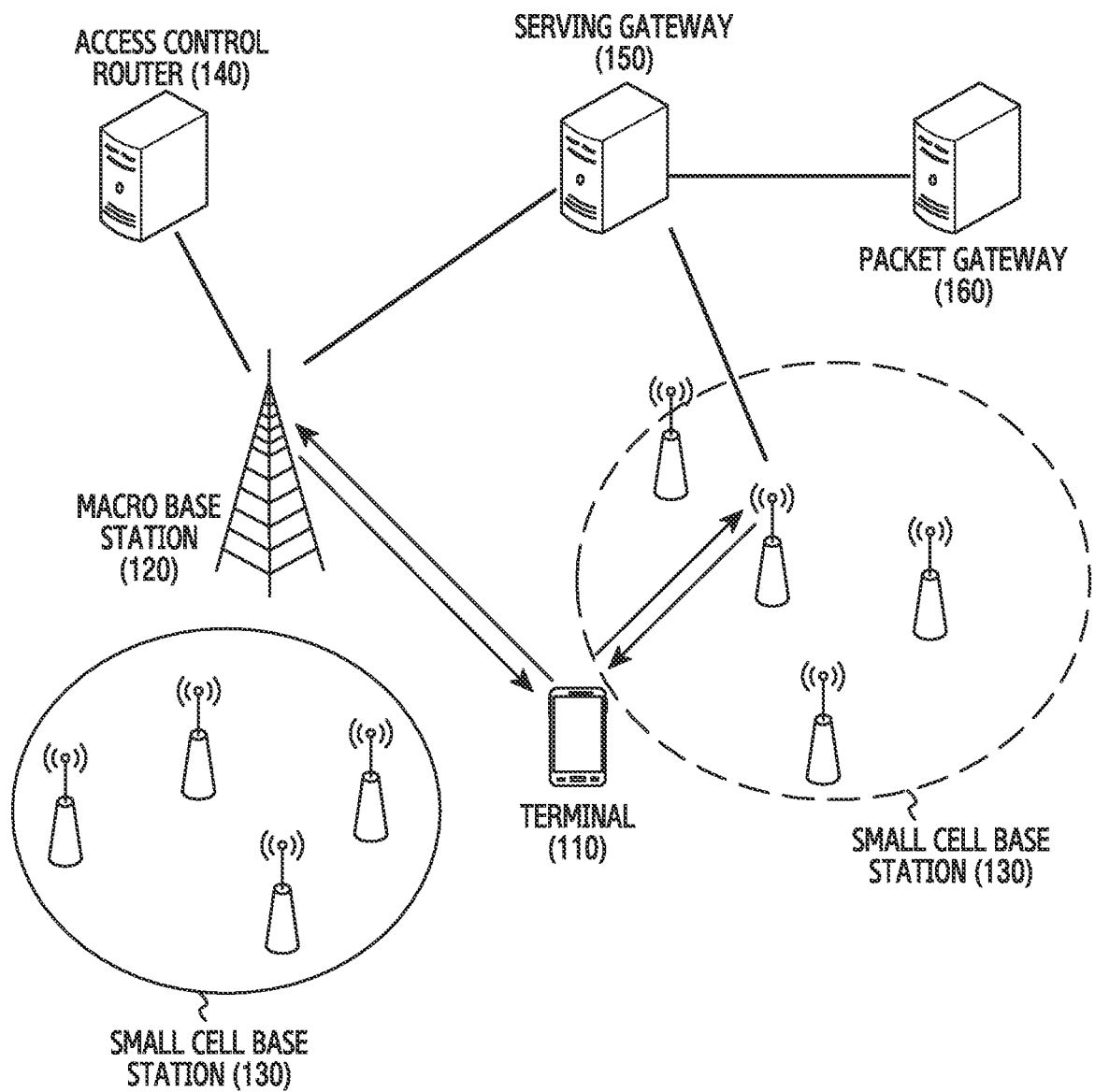
FIG. 1 is a diagram schematically illustrating a wireless communication system in which a macro cell and a small cell coexist according to an exemplary embodiment of the present invention.

FIG. 1 schematically illustrates a wireless communication system in which a macro cell and a small cell coexist according to an exemplary embodiment of the present invention.

Referring to the FIG. 1, the wireless communication system includes a terminal 110, a macro base station 120, a small cell base station 130, an access control router 140, a serving gateway (S-GW) 150, and a packet gateway (P-GW) 160.

The terminal 110 is a user device. The terminal 110 may be a smartphone, or a device designed for data communication only. The terminal 110 may connect to the macro base station 120, the small cell base station 130.

The macro base station 120 and the small cell base station 130 provide a wireless connection to the terminal 110, thereby supporting a connectivity between the terminal 110 and a network. Cells of the macro base station 120 and the small cell base station 130 may be overlapped with each other. The macro base station 120 and the small cell base station 130 are divided according to relative sizes and hierarchical relations of cells. Accordingly, the small cell base station 130 may be installed for various purposes such as sharing, supplementing of a role of the macro base station 120, a separate service, etc. In detail, the macro base station 120 and the small cell base station 130 may be network entities belonging to the same system. For another example, the macro base station 120 and the small cell base station 130 may be network entities belonging to different systems (e.g., cellular, wireless LAN). That is, the macro base station 120 may be a cellular base station, and the small cell base station 130 may be an AP (Access Point).

The access control router 140 manages the mobility of the terminal 110. Also, the access control router 140 may further perform authentication on the terminal 110, bearer management, etc. The access control router 140 may be called an 'MME (Mobility Management Entity)'.

The serving gateway 150 processes packets arrived from the macro base station 120 and the small cell base station 130 or packets to be forwarded to the macro base station 120 and the small cell base station 130. Also, the serving gateway 150 may perform an anchoring role at handover of the terminal 110. The packet gateway 160 may function as a connectivity point with an external network (e.g., the Internet network). Also, the packet gateway 160 allocates an IP (Internet Protocol) address to the terminal 110.

The macro base station 120 is connected with the access control router 140, the serving gateway 150. The small cell base station 130 is connected with the serving gateway 150. In accordance with another exemplary embodiment of the present invention, the small cell base station 130 may not have a connectivity with the serving gateway 150. The small cell base station 130 is connected with the macro base station 120. Also, a plurality of small cell base stations 130 construct a small cell cluster. The terminal 110 may be connected to the macro base station 120, or be connected to the small cell base station 130, or form a dual connectivity to the macro base station 120 and the small cell base station 130.

As described above, a terminal may form a dual connectivity with a macro base station and a small cell base station. Accordingly to this, the terminal may concurrently transmit/receive data with all of a macro cell and a small cell. But, in case that the terminal is a hardware device difficult to set a simultaneous connectivity to the macro cell and the small cell, particularly, in case of uplink, there may be a limit in performing service through the simultaneous connectivity due to a difference of a transmission power in the macro cell and the small cell.

The macro cell may provide service at a low frequency band, and the small cell may provide service at a high frequency band not adjacent with the macro cell. In this case, setting to receive a support of a high data rate only from the small cell may be more advantageous than implementing a complex hardware in a terminal in order to set a simultaneous connectivity to the macro cell and the small cell and transmit/receive data.

Therefore, in accordance with an exemplary embodiment of the present invention, time durations connected to the macro cell and the small cell are separated, whereby a terminal may be serviced from all of the macro cell and the small cell. At this time, a resource allocated in order for the terminal to transmit/receive data in the macro cell and the small cell should be allocated in consideration of a time required for the terminal to switch a cell. However, if a resource is allocated without considering the time required to switch, some resources may be discarded without being used. For example, if an uplink resource is allocated without considering the time required to switch, an uplink resource allocated while the terminal switches from the macro cell to the small cell or in a duration in which it switches from the small cell to the macro cell cannot be used by the terminal.

Accordingly, various exemplary embodiments of the present invention propose a way of resource use of the macro cell and the small cell.

Figure 2A:
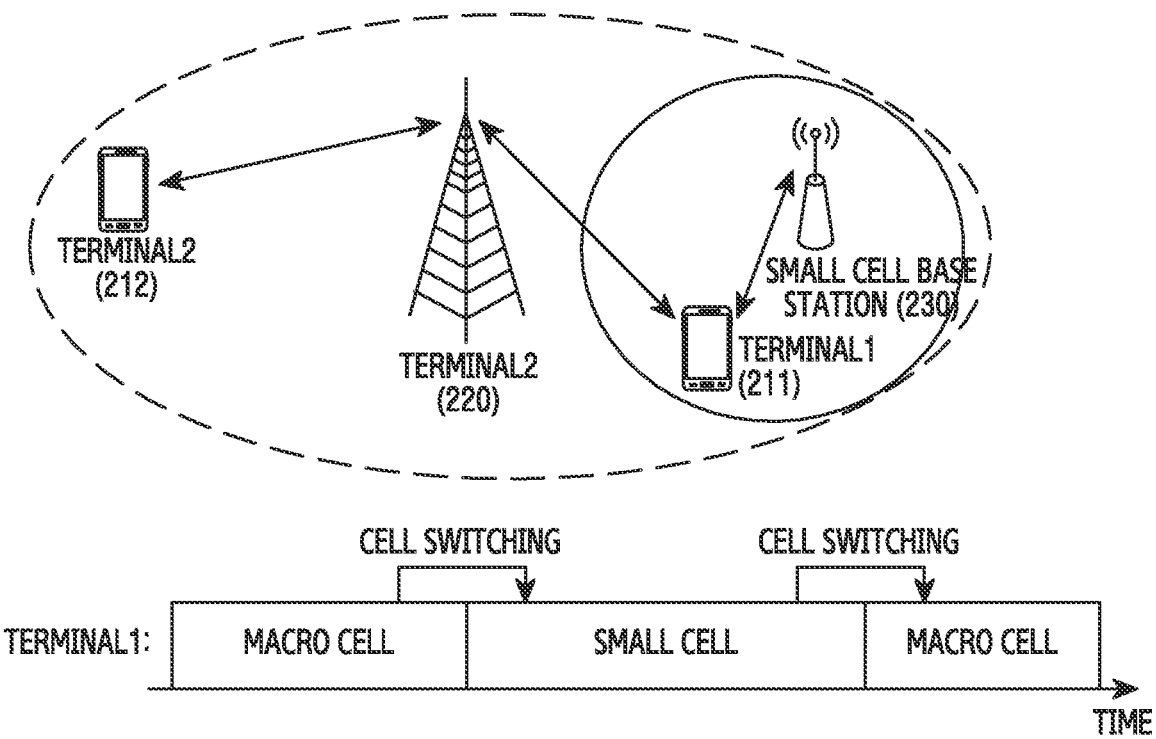
FIGS. 2A, 2B, and 2C are diagrams illustrating time based switching between a macro cell and a small cell in a wireless communication system according to an exemplary embodiment of the present invention.
Figure 2B:
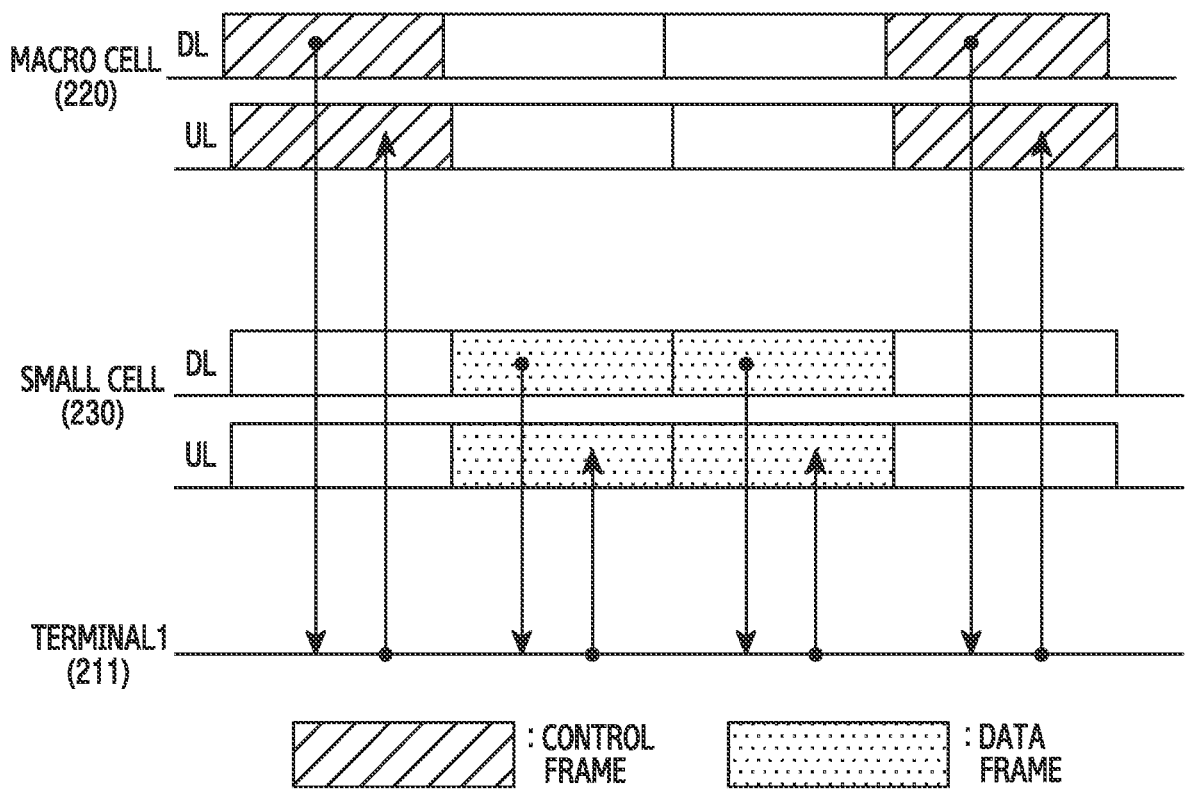
Figure 2C:
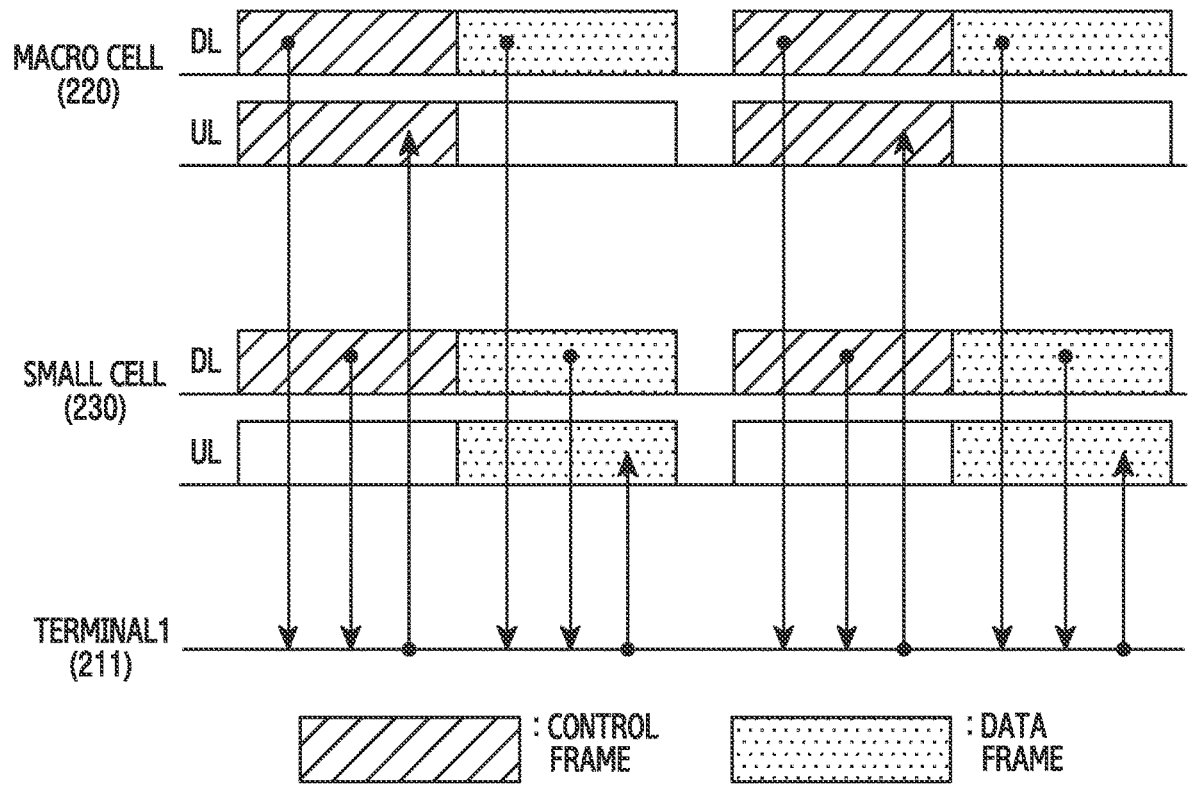

FIG. 2A to FIG. 2C illustrate time based switching between a macro cell and a small cell in a wireless communication system according to an exemplary embodiment of the present invention.

Referring to the FIG. 2A, a terminal1 211 is located within service areas of a macro base station 220 and a small cell base station 230, and a terminal2 212 is located within a service area of the macro base station 220. The terminal1 211 is serviced during a time duration (t) through the macro base station 220. If the time duration (t) is ended, the terminal1 211 switches to the small cell base station 230 and then, is serviced during a time duration (t+1) through the small cell base station 230. If the time duration (t+1) is ended, the terminal1 211 switches to the macro base station 220, and is serviced through the macro base station 220 during a time duration (t+2).

FIG. 2B illustrates one example of time arrangement in which the terminal1 211 performs time based switching between the macro base station 220 and the small cell base station 230. The macro base station 220 services a control signal of the terminal1 211, and the small cell base station 230 services user data of the terminal1 211. A control signal frame and user data frame for the terminal1 211 may be defined at a time point at which the terminal1 211 initiates a dual connectivity to the macro base station 220 and the small cell base station 230. For example, the control signal frame may be used in order for the terminal1 211 to exchange, with the macro base station 220, a signal for performing a channel measurement report or an operation of an RRC (Radio Resource Control) layer. The user data frame is used in order for the terminal1 211 to exchange, with the small cell base station 230, packets of service (data or voice) to be received. At this time, the macro base station 220 does not need to maintain a resource (e.g., bearer connectivity information) for processing the user data.

The FIG. 2C illustrates another example of time arrangement in which the terminal1 211 performs time based switching between the macro base station 220 and the small cell base station 230. Referring to the FIG. 2C, the macro base station 220 services a control signal and user downlink data of the terminal1 211, and the small cell base station 230 services user downlink data and uplink data of the terminal 211. In case of the user downlink data, the terminal1 211 may be concurrently serviced from the macro base station 220 and the small cell base station 230, or may be serviced from one of the macro base station 220 and the small cell base station 230. The user uplink data is serviced only by the small cell base station 230. Therefore, in accordance with a service time point of the user uplink data, the terminal1 211 performs time based switching to the small cell base station 230. Accordingly to this, the macro base station 220 does not need to maintain a resource (e.g., bearer connectivity information) for the user uplink data.

In another example of the time based switching between the macro base station and the small cell base station, the macro cell and small cell may provide services of different types. In this case, a terminal may perform time based switching between the macro base station and the small cell base station in accordance with a service time point of the macro cell and a service time point of the small cell.

Figure 3:
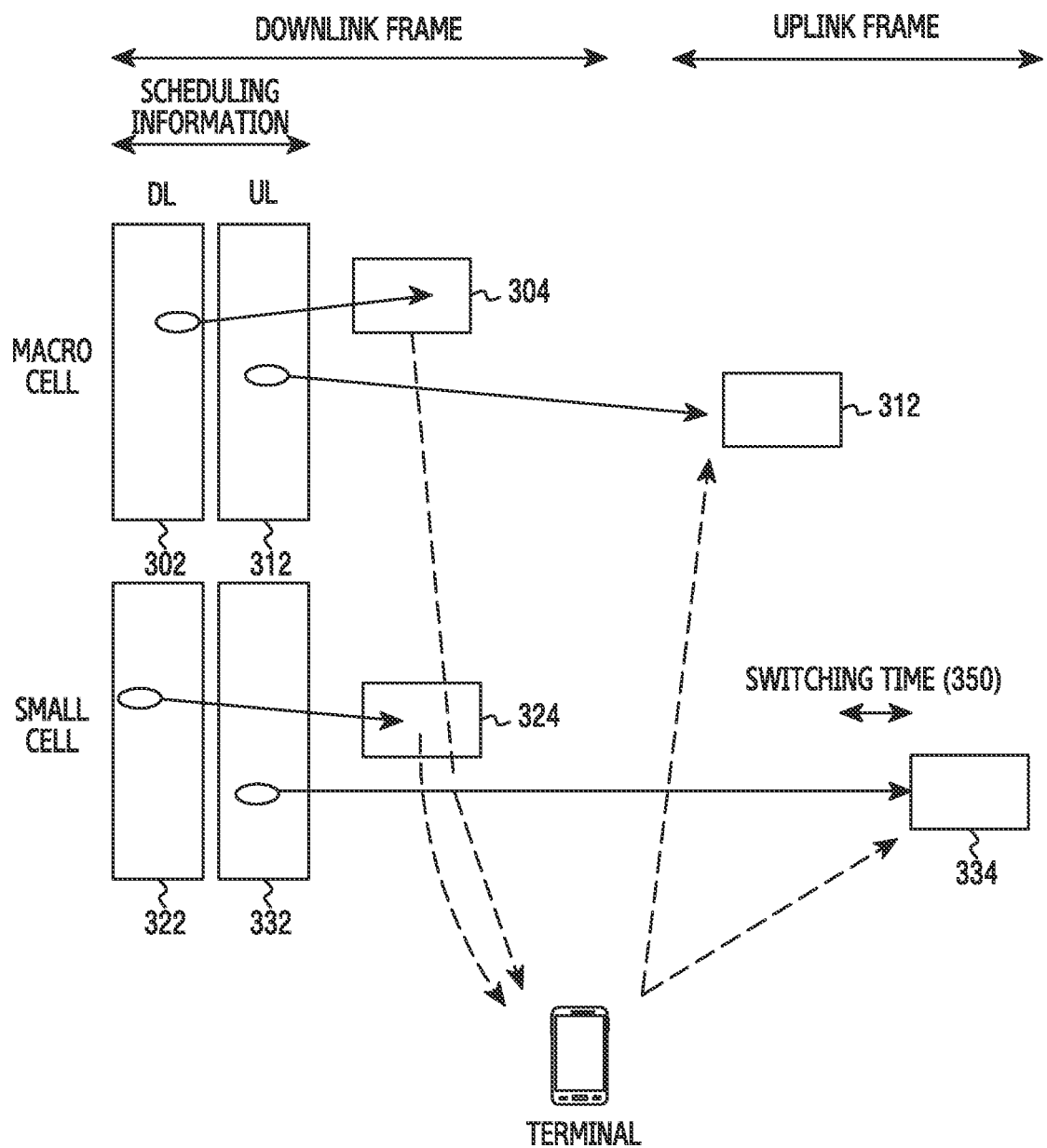
FIG. 3 is a diagram illustrating resource use for cell switching in a communication system according to a first exemplary embodiment of the present invention.

FIG. 3 illustrates resource use for cell switching in a communication system according to a first exemplary embodiment of the present invention.

Referring to the FIG. 3, a macro base station and a small cell base station each transmit scheduling information, i.e., resource allocation information for a terminal. In detail, the macro base station indicates a resource 304 allocated in its own downlink frame through downlink scheduling information 302, a resource 314 allocated in its own uplink frame through uplink scheduling information 312. And, the small cell base station indicates a resource 324 allocated in its own downlink frame through downlink scheduling information 322, a resource 334 allocated in its own uplink frame through uplink scheduling information 332. Accordingly to this, the terminal receives downlink data and transmits uplink data with each base station through the resource checked by the resource allocation information from each of the macro base station and the small cell base station.

The terminal may receive downlink data from each of base stations without switching between the macro cell and the small cell. However, in case of transmitting uplink data, the terminal needs switching between the macro cell and the small cell. At this time, a certain time delay occurs for the switching. Therefore, when the macro base station and the small cell base station allocate an uplink resource for the terminal, a time required for the switching of the terminal should be taken into consideration. The time required for the switching is related to a hardware capability of the terminal and therefore, may be provided to a base station during a capability negotiation procedure of an initial connection procedure of the terminal or a procedure proportional to this. For description's convenience below, the present invention calls the 'certain time required for the cell switching related to the hardware capability of the terminal', a 'switching delay time'. Switching delay time information of the terminal may be provided to the macro base station by the terminal, and may be forwarded to the small cell base station by the macro base station. Or, the terminal may provide to the macro base station and the small cell base station.

The FIG. 3 illustrates an exemplary embodiment of a TDD scheme in which a downlink frame and an uplink frame are divided by time. However, in accordance with another exemplary embodiment of the present invention, the resource use illustrated in the FIG. 3 may be applied identically even in case of an FDD (Frequency Division Multiplexing) scheme in which uplink and downlink are divided by a frequency.

Figure 4:
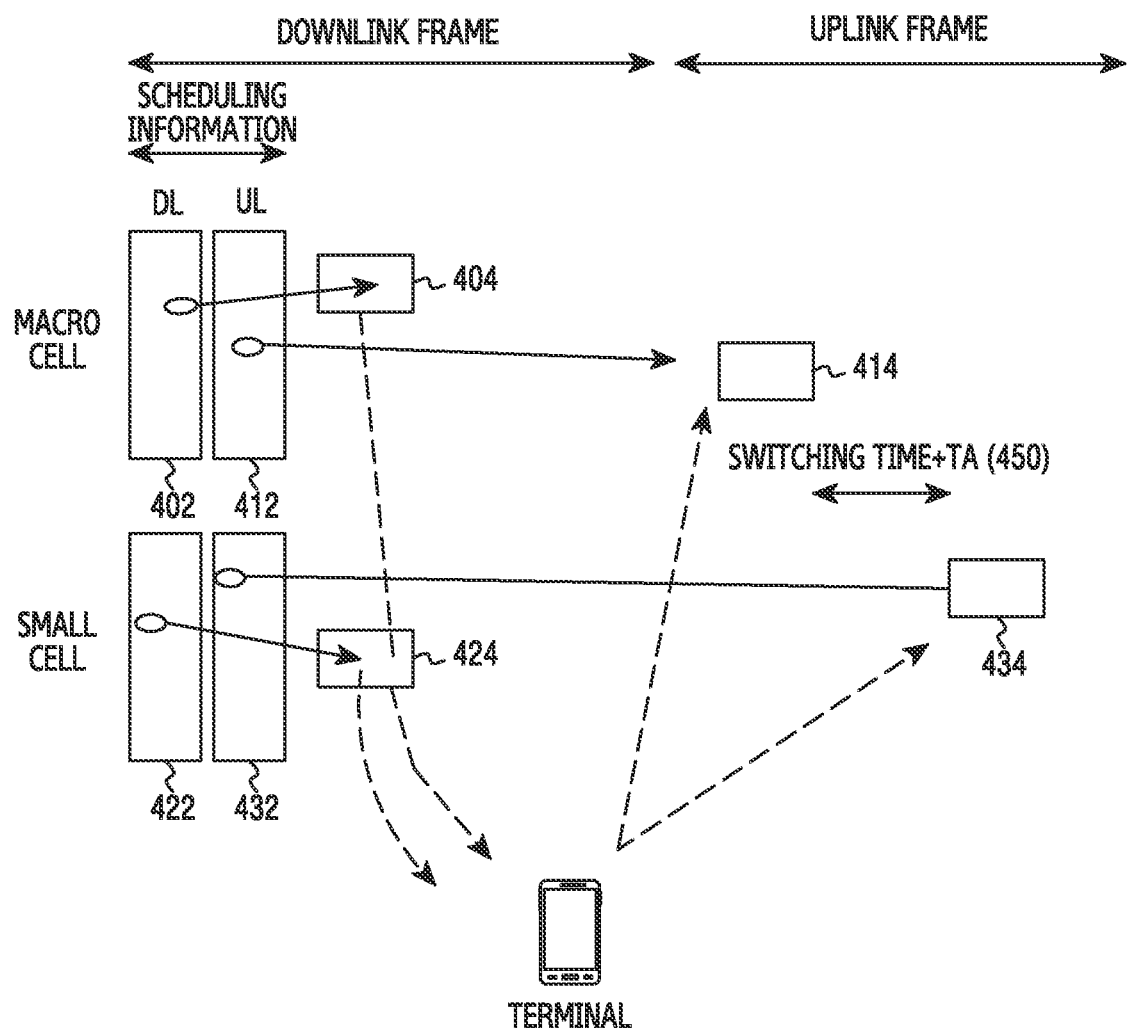
FIG. 4 is a diagram illustrating resource use for cell switching in a communication system according to a second exemplary embodiment of the present invention.

FIG. 4 illustrates resource use for cell switching in a communication system according to a second exemplary embodiment of the present invention.

Referring to the FIG. 4, a macro base station and a small cell base station each transmit scheduling information, i.e., resource allocation information for a terminal. In detail, the macro base station indicates a resource 404 allocated in its own downlink frame through downlink scheduling information 402, a resource 414 allocated in its own uplink frame through uplink scheduling information 412. And, the small cell base station indicates a resource 424 allocated in its own downlink frame through downlink scheduling information 422, a resource 434 allocated in its own uplink frame through uplink scheduling information 432. Accordingly to this, the terminal receives downlink data and transmits uplink data with each base station through the resource checked by the resource allocation information from each of the macro base station and the small cell base station.

The terminal may receive downlink data from each of base stations without switching between the macro cell and the small cell. However, in case of transmitting uplink data, the terminal needs switching between the macro cell and the small cell. At this time, a certain time delay occurs for the switching. Therefore, when the macro base station and the small cell base station allocate an uplink resource of the terminal, a switching delay time of the terminal should be taken into consideration. Further, unlike the exemplary embodiment illustrated in the FIG. 3, even a TA (Timing Advance) caused by a propagation delay between the terminal and the base station should be considered. The TA means how earlier a signal should be transmitted than desired timing in order for the signal to reach a receive end at the timing. The TA increases as a distance between the terminal and the base station increases. The TA information may be acquired through an RACH (Random Access Channel) procedure or an RA (Random Access) procedure the terminal performs with each base station. The terminal may provide TA information on the small cell base station to the macro base station, and provide TA information on the macro base station to the small cell base station. Or, the macro base station and the small cell base station may directly exchange TA information of the terminal. The macro base station and the small cell base station determine a cell switching time of the terminal on the basis of the switching delay time of the terminal, TAs. And, the macro base station and the small cell base station allocate an uplink resource for the terminal in consideration of the cell switching time of the terminal.

The FIG. 4 illustrates an exemplary embodiment of a TDD scheme in which a downlink frame and an uplink frame are divided by time. However, in accordance with another exemplary embodiment of the present invention, the resource use illustrated in the FIG. 4 may be applied identically even in case of an FDD scheme in which uplink and downlink are divided by a frequency.

Figure 5:
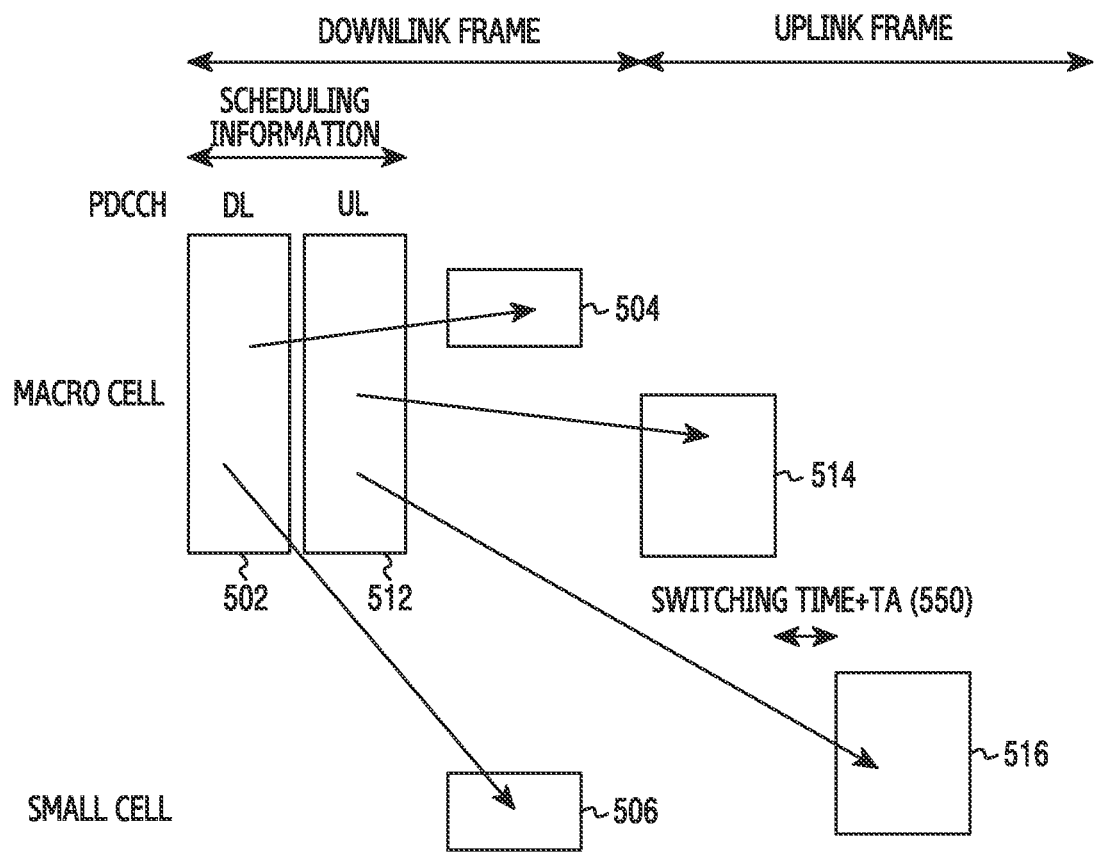
FIG. 5 is a diagram illustrating resource use for cell switching in a communication system according to a third exemplary embodiment of the present invention.

FIG. 5 illustrates resource use for cell switching in a communication system according to a third exemplary embodiment of the present invention.

Referring to the FIG. 5, a macro base station transmits scheduling information, i.e., resource allocation information for a terminal. In detail, the macro base station indicates a resource 504 allocated in its own downlink frame through downlink scheduling information 502 and a resource 506 allocated in a downlink frame of a small cell base station, a resource 514 allocated in its own uplink frame through uplink scheduling information 512 and a resource 516 allocated in an uplink frame of the small cell base station. Accordingly to this, the terminal receives downlink data and transmits uplink data with each base station through the resource checked by the resource allocation information from the macro base station.

Similarly to the exemplary embodiment illustrated in the FIG. 4, when the macro base station allocates an uplink resource of the terminal, a switching delay time of the terminal and TAs are considered. That is, the macro base station determines a cell switching time of the terminal on the basis of the switching delay time of the terminal, the TAs, and allocates the uplink resource for the terminal in consideration of the cell switching time of the terminal.

The FIG. 5 illustrates an exemplary embodiment of a TDD scheme in which a downlink frame and an uplink frame are divided by time. However, in accordance with another exemplary embodiment of the present invention, the resource use illustrated in the FIG. 5 may be applied identically even in case of an FDD scheme in which uplink and downlink are divided by a frequency.

Figure 6:
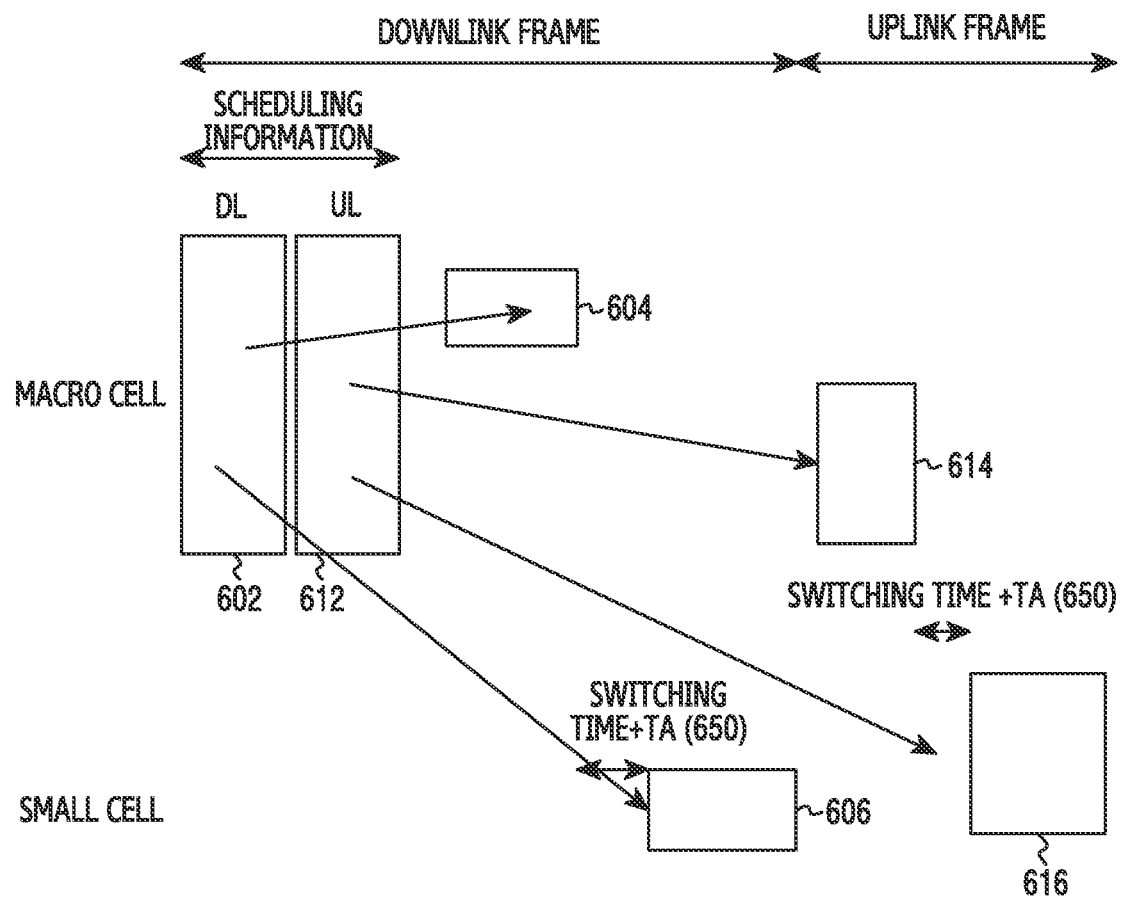
FIG. 6 is a diagram illustrating resource use for cell switching in a communication system according to a fourth exemplary embodiment of the present invention.

FIG. 6 illustrates resource use for cell switching in a communication system according to a fourth exemplary embodiment of the present invention.

Referring to the FIG. 6, a macro base station transmits scheduling information, i.e., resource allocation information for a terminal. In detail, the macro base station indicates a resource 604 allocated in its own downlink frame through downlink scheduling information 602 and a resource 606 allocated in a downlink frame of a small cell base station, a resource 614 allocated in its own uplink frame through uplink scheduling information 612 and a resource 616 allocated in an uplink frame of the small cell base station. Accordingly to this, the terminal receives downlink data and transmits uplink data with each base station through the resource checked by the resource allocation information from the macro base station.

Unlike the exemplary embodiments illustrated in the FIG. 3 to the FIG. 5, in case of the exemplary embodiment illustrated in the FIG. 6, even downlink data reception is accompanied by switching. Accordingly to this, when a downlink resource and an uplink resource are allocated for the terminal, a switching delay time of the terminal and TAs are considered. That is, the macro base station determines a cell switching time of the terminal on the basis of the switching delay time of the terminal, the TAs, and allocates the downlink resource and the uplink resource for the terminal in consideration of the cell switching time of the terminal.

The FIG. 6 illustrates an exemplary embodiment of a TDD scheme in which a downlink frame and an uplink frame are divided by time. However, in accordance with another exemplary embodiment of the present invention, the resource use illustrated in the FIG. 6 may be applied identically even in case of an FDD scheme in which uplink and downlink are divided by a frequency.

Figure 7:
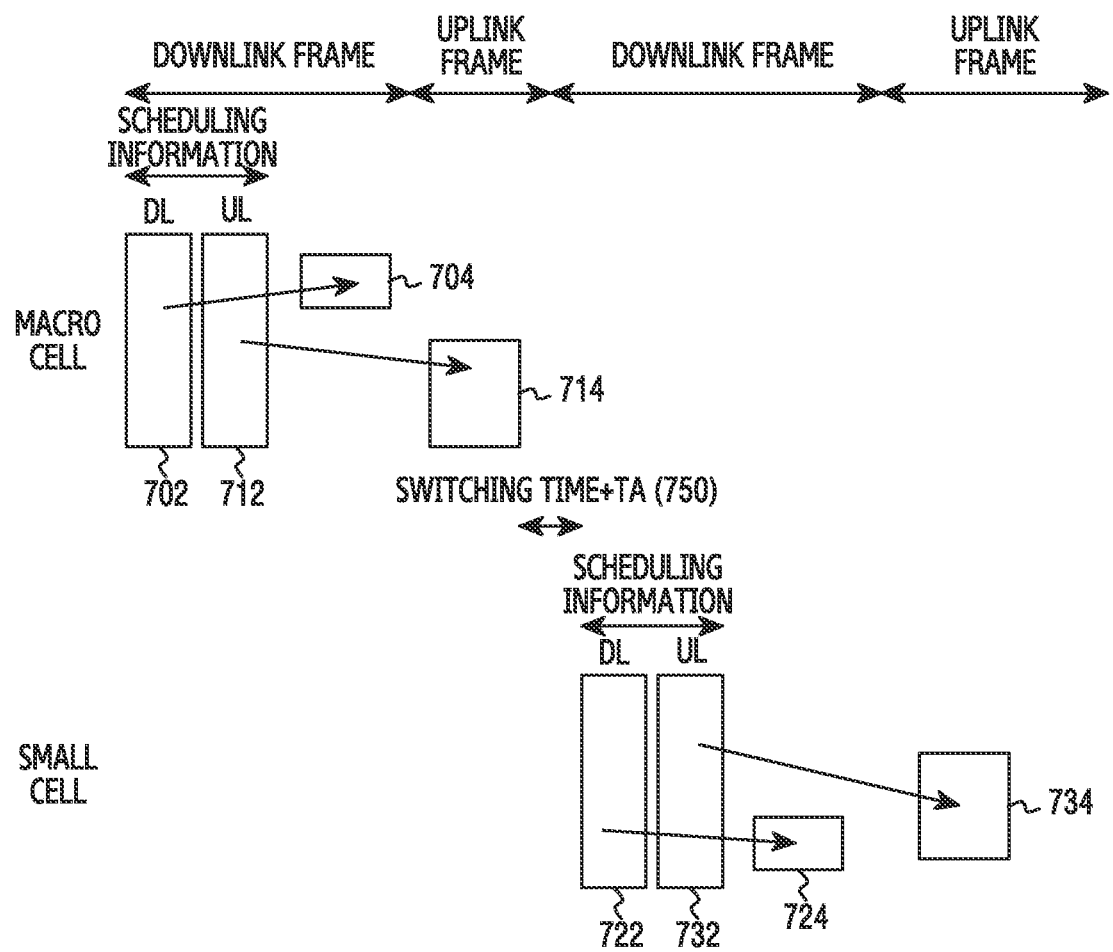
FIG. 7 is a diagram illustrating resource use for cell switching in a communication system according to a fifth exemplary embodiment of the present invention.

FIG. 7 illustrates resource use for cell switching in a communication system according to a fifth exemplary embodiment of the present invention.

Referring to the FIG. 7, a macro base station and a small cell base station each transmit scheduling information, i.e., resource allocation information for a terminal. In detail, the macro base station indicates a resource 704 allocated in its own downlink frame through downlink scheduling information 702, a resource 714 allocated in its own uplink frame through uplink scheduling information 712. And, the small cell base station indicates a resource 724 allocated in its own downlink frame through downlink scheduling information 722, a resource 734 allocated in its own uplink frame through uplink scheduling information 732. Accordingly to this, the terminal receives downlink data and transmits uplink data with each base station through the resource checked by the resource allocation information from each of the macro base station and the small cell base station.

Unlike the exemplary embodiments of the FIG. 3 to the FIG. 6, in case of the FIG. 7, switching is performed by the unit of frame. That is, one specific frame is used for communication with the macro base station or the small cell base station, and the other specific frame is used for communication with the small cell base station or the macro base station. Accordingly, a terminal receives only scheduling information on one base station in one frame. In this case, a time for cell switching between an uplink resource in an uplink frame of a front end on a basis of switching and a control channel including scheduling information in a downlink frame of a rear end is provided. Generally, a position of the control channel is fixed within a frame and therefore, when the uplink resource in the uplink frame of the front end is allocated, a switching delay time of the terminal and TAs should be considered.

The FIG. 7 illustrates an exemplary embodiment of a TDD scheme in which a downlink frame and an uplink frame are divided by time. However, in accordance with another exemplary embodiment of the present invention, the resource use illustrated in the FIG. 7 may be applied identically even in case of an FDD scheme in which uplink and downlink are divided by a frequency.

As described above, it is required to guarantee a time to perform switching between a macro cell and a small cell. In other words, it is required that a certain interval between a resource region allocated in the macro cell and a resource region allocated in the small cell exists. The interval between the resource regions may be provided through various procedures. For example, in accordance with an exemplary embodiment of the present invention, the time to perform the switching may be secured by setting not to allocate a certain resource region.

For example, in case that resources are allocated in order of a resource of a macro cell, a resource of a small cell on time axis, a resource to be empty may be set to the resource of the small cell for a sum or more of the resource of the macro cell and a resource of a cell switching time. For description's convenience below, the present invention calls the 'resource to make empty' a 'resource empty'. The resource empty may be defined as at least one unit among a symbol, a slot, a subframe. The resource empty is set to at least one of the resource of the macro cell and the resource of the small cell.

Figure 8:
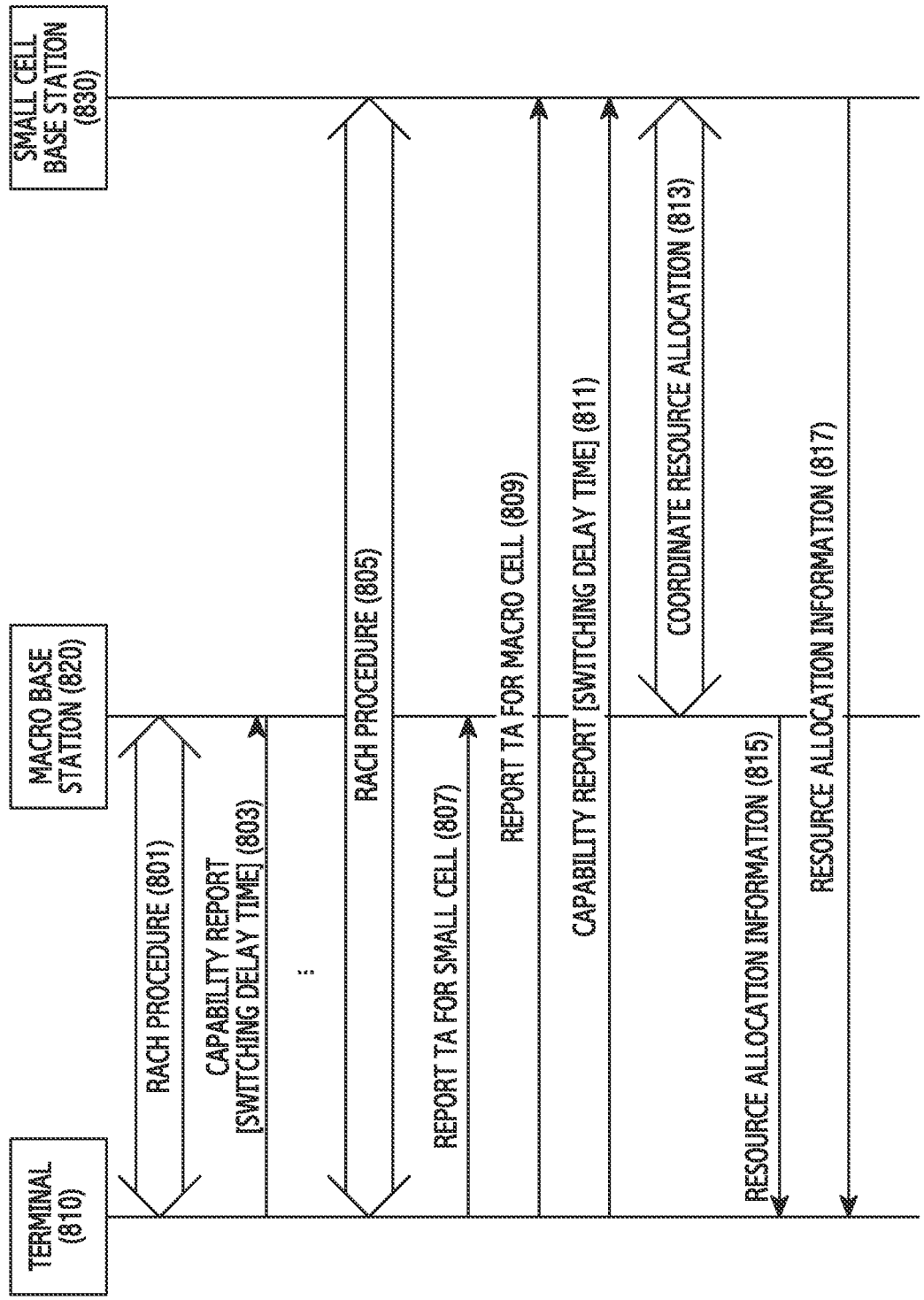
FIG. 8 is a diagram illustrating a signal exchange for resource use in a wireless communication system according to an exemplary embodiment of the present invention.

FIG. 8 illustrates a signal exchange for resource use in a wireless communication system according to an exemplary embodiment of the present invention.

Referring to the FIG. 8, in step 801, a terminal 810 performs an RACH procedure with a macro base station 820 during an initial connection procedure. For example, the terminal 810 selects a resource for random access, and transmits a random access preamble, and then receives a random access response from the macro base station 820. Through the RACH procedure, the terminal 810 and the macro base station 820 may acquire TA information on the macro base station 820. For example, the macro base station 820 estimates a transmission timing of the terminal 810 using the random access preamble, and transmits a TA command related to a TA through the random access response.

In step 803, the terminal 810 transmits capability information including a switching delay time to the macro base station 820. The capability information may include information on other hardware, software capability besides the switching delay time. In accordance with another exemplary embodiment of the present invention, the switching delay time may be forwarded through a separate procedure or a separate message.

In step 805, if a small cell base station 830 to service the terminal 810 is determined, the terminal 810 performs an RACH procedure so as to connect to the small cell base station 830. Through the RACH procedure, the terminal 810 may acquire TA information on the small cell base station 830. For example, the terminal 810 selects a resource for random access, and transmits a random access preamble, and then receives a random access response from the macro base station 820. Through the RACH procedure, the terminal 810 and the macro base station 820 may acquire TA information on the macro base station 820. For example, the macro base station 820 estimates a transmission timing of the terminal 810 using the random access preamble, and transmits a TA command related to a TA through the random access response.

In step 807, the terminal 810 reports the TA information on the small cell base station 830 to the macro base station 820. Here, the TA information may directly or indirectly express, by the unit of time, resource, etc., a difference of time between a time point of transmission in the terminal 810 and a time point of reception in the small cell base station 830.

In step 809, the terminal 810 reports the TA information on the macro base station 820 to the small cell base station 830. Here, the TA information may directly or indirectly express, by the unit of time, resource, etc., a difference of time between a time point of transmission in the terminal 810 and a time point of reception in the macro base station 820.

In step 811, the terminal 810 transmits capability information including switching delay time information of the terminal 810 to the small cell base station 830. The capability information may include information on other hardware, software capability besides the switching delay time. In accordance with another exemplary embodiment of the present invention, the switching delay time may be forwarded through a separate procedure or a separate message.

In step 813, the macro base station 820 and the small cell base station 830 coordinate resource allocation for the terminal 810. For this, the macro base station 820 and the small cell base station 830 may exchange information of a required resource amount, an available resource amount, a position (e.g., frame, subframe, symbol/slot/sub channel position, etc.) of a resource to be actually allocated, etc. In detail, the macro base station 820 and the small cell base station 830 determine a cell switching time based on the switching delay time of the terminal 810 and the TAs. At this time, the macro base station 820 and the small cell base station 830 determine a resource empty in consideration of the cell switching time of the terminal 810. The resource empty may be expressed by the unit of frame, subframe, slot, symbol, etc. For example, the resource empty may be used to make empty a certain duration in the last subframe of macro base station downlink, or in the first subframe of macro base station uplink, or in the last subframe of small cell base station downlink, or in the first subframe of small cell base station uplink. In accordance with one exemplary embodiment of the present invention, information on the resource empty may be forwarded even to the terminal 810. For example, the information on the resource empty may be provided as a part of the resource allocation information provided to the terminal 810. If the macro base station 820 and the small cell base station 830 are network entities belonging to different systems, information provided between the macro base station 820 and the small cell base station 830 may be transmitted after being processed into a form interpretable at a reception side, or the reception side may have a capability capable of interpreting a format of a transmission side system. Or, a third entity for processing of the information exists, and the third entity may process and forward the information.

In step 815, the macro base station 820 allocates a resource for the terminal 810 in consideration of the cell switching time of the terminal 810, a resource state, and transmits resource allocation information.

In step 817, the small cell base station 830 allocates a resource for the terminal 810 in consideration of the cell switching time of the terminal 810, a resource state, and transmits resource allocation information. At this time, in case that the resource empty is set in a resource of the small cell base station 830, the small cell base station 830 allocates a resource to the terminal 810 in the remnant region excepting the resource empty. For example, if the resource empty is two subframes of an uplink region, the small cell base station 830 allocates a resource to the terminal 810 in the remnant region excepting two subframes of a front end of the uplink region.

Figure 9:
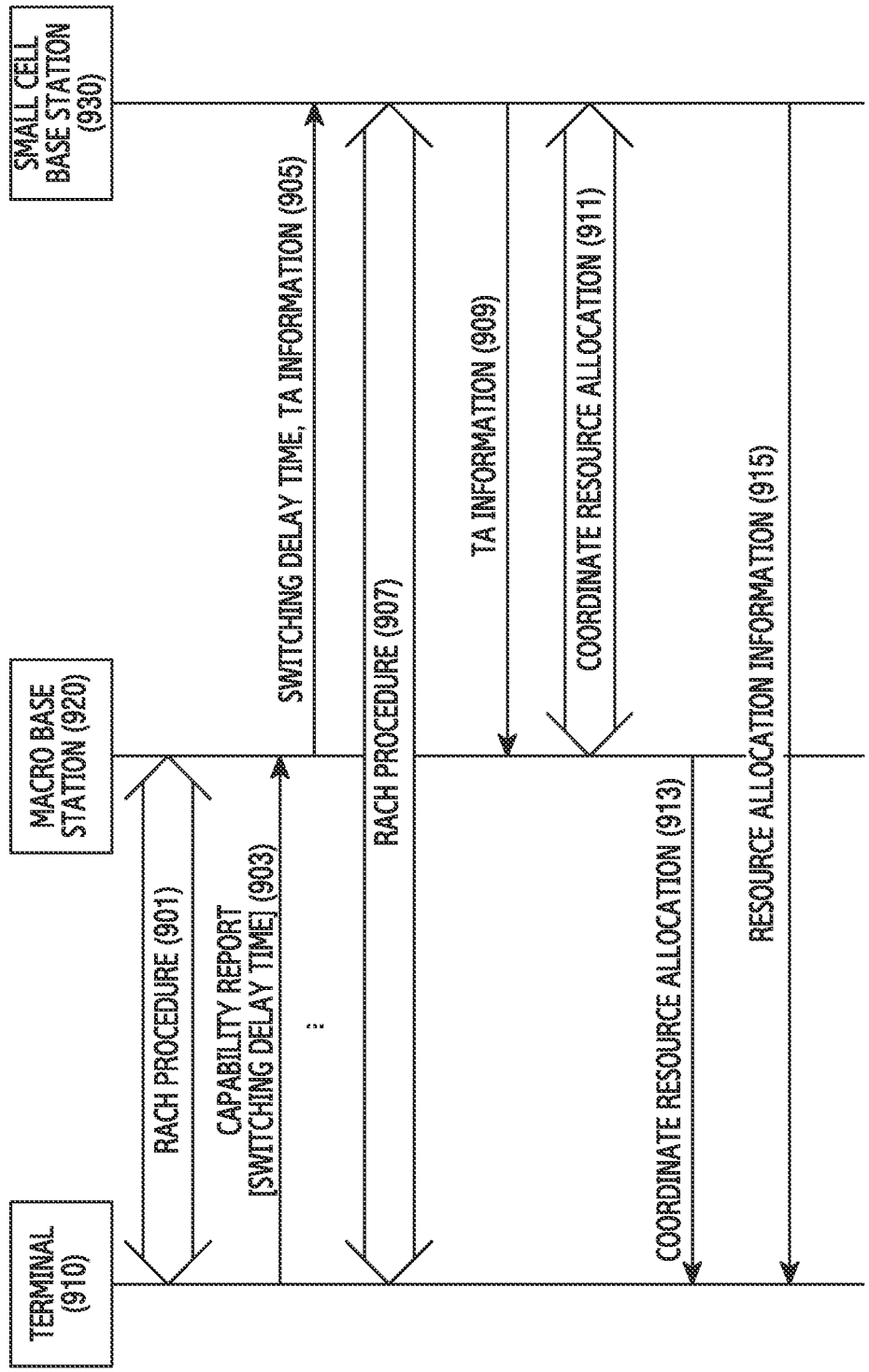
FIG. 9 is a diagram illustrating a signal exchange for resource use in a wireless communication system according to another exemplary embodiment of the present invention.

FIG. 9 illustrates a signal exchange for resource use in a wireless communication system according to another exemplary embodiment of the present invention.

Referring to the FIG. 9, in step 901, a terminal 910 performs an RACH procedure with a macro base station 920 for the sake of initial connection. For example, the terminal 910 selects a resource for random access, and transmits a random access preamble, and then receives a random access response from the macro base station 920. Through the RACH procedure, the terminal 910 and the macro base station 920 may acquire TA information on the macro base station 920. For example, the macro base station 920 estimates a transmission timing of the terminal 910 using the random access preamble, and transmits a TA command related to a TA through the random access response.

In step 903, the terminal 910 transmits capability information including a switching delay time to the macro base station 920. The capability information may include information on other hardware, software capability besides the switching delay time. In accordance with another exemplary embodiment of the present invention, the switching delay time may be forwarded through a separate procedure or a separate message.

In step 905, if a small cell base station 930 the terminal 910 is to connect is determined, the macro base station 920 provides, to the small cell base station 930, a switching delay time of the terminal 910 and TA information on the macro base station 920. Here, the TA information may directly or indirectly express, by the unit of time, resource, etc., a difference of time between a time point of transmission in the terminal 910 and a time point of reception in the macro base station 920.

In step 907, the terminal 910 performs an RACH procedure so as to connect to the small cell base station 930. Through the RACH procedure, the small cell base station 920 may acquire TA information on the small cell base station 930. For example, the terminal 910 selects a resource for random access, and transmits a random access preamble, and then receives a random access response from the small cell base station 930. Through the RACH procedure, the terminal 910 and the small cell base station 930 may acquire TA information on the small cell base station 930. For example, the small cell base station 930 estimates a transmission timing of the terminal 910 using the random access preamble, and transmits a TA command related to a TA through the random access response.

In step 909, the small cell base station 930 transmits, to the macro base station 920, the TA information on the small cell base station 930 of the terminal 910. Here, the TA information may directly or indirectly express, by the unit of time, resource, etc., a difference of time between a time point of transmission in the terminal 910 and a time point of reception in the small cell base station 930.

In step 911, the macro base station 920 and the small cell base station 930 coordinate resource allocation for the terminal 910. For this, the macro base station 920 and the small cell base station 930 may exchange information of a required resource amount, an available resource amount, a position (e.g., frame, subframe, symbol/slot/sub channel position, etc.) of a resource to be actually allocated, etc. In detail, the macro base station 920 and the small cell base station 930 determine a cell switching time based on the switching delay time of the terminal 910 and TAs, and determine a resource empty of each cell in consideration of the cell switching time. The resource empty may be expressed by the unit of frame, subframe, slot, symbol, etc. For example, the resource empty may be used to make empty a certain duration in the last subframe of macro base station downlink, or in the first subframe of macro base station uplink, or in the last subframe of small cell base station downlink, or in the first subframe of small cell base station uplink. In accordance with one exemplary embodiment of the present invention, information on the resource empty may be forwarded even to the terminal 910. For example, the information on the resource empty may be provided as a part of the resource allocation information provided to the terminal 910. If the macro base station 920 and the small cell base station 930 are network entities belonging to different systems, information provided between the macro base station 920 and the small cell base station 930 may be transmitted after being processed into a form interpretable at a reception side, or the reception side may have a capability capable of interpreting a format of a transmission side system. Or, a third entity for processing of the information exists, and the third entity may process and forward the information.

In step 913, the macro base station 920 allocates a resource for the terminal 910 in consideration of the cell switching time of the terminal 910, a resource state, and transmits resource allocation information.

In step 915, the small cell base station 930 allocates a resource for the terminal 910 in consideration of the cell switching time of the terminal 910, a resource state, and transmits resource allocation information. At this time, in case that the resource empty is set in a resource of the small cell base station 930, the small cell base station 930 allocates a resource to the terminal 910 in the remnant region excepting the resource empty. For example, if the resource empty is two subframes of an uplink region, the small cell base station 930 allocates a resource to the terminal 910 in the remnant region excepting two subframes of a front end of the uplink region.

By using resources as mentioned above, a terminal may perform communication with each base station through switching. However, due to wrong determination of a cell switching time, a change of TA, other errors, etc., a situation in which a resource region allocated in each cell conflicts may take place.

The conflict represents a case in which all of a first resource allocated by a macro base station and a second resource allocated by a small cell base station cannot be used due to the cell switching time of the terminal. For example, in case that some or all of the first resource and the second resource are overlapped, the conflict may take place. Or, although the first resource and the second resource are not overlapped, in case that a difference of time between a time point to transmit/receive a signal through the first resource and a time point to transmit/receive a signal through the second resource is less than the cell switching time, in other words, in case that a suitable resource empty is not guaranteed, the conflict may take place.

For example, the conflict of the resource regions may be determined by a failure of transmission of uplink data to all or any one of the macro base station and the small cell base station in the resource region indicated by the resource allocation information of each of the macro base station and the small cell base station. That is, the conflict may take place in case that a time for switching of the terminal between the two base stations is determined too long or too short and thus the uplink resource allocation fails to reflect the cell switching time of the terminal. In detail, the conflict may be detected by failing to receive a feedback about uplink data transmitted by the terminal or receiving a NAK (Non-acknowledgement).

For another example, in case that the resource empty is notified to the terminal, the terminal may determine whether the resource region allocated to the terminal indicated by the resource allocation information belongs within the resource empty. In this case, the terminal may expect, prior to observing successful reception or non-reception of the uplink data, a conflict of the resource regions.

Figure 10:
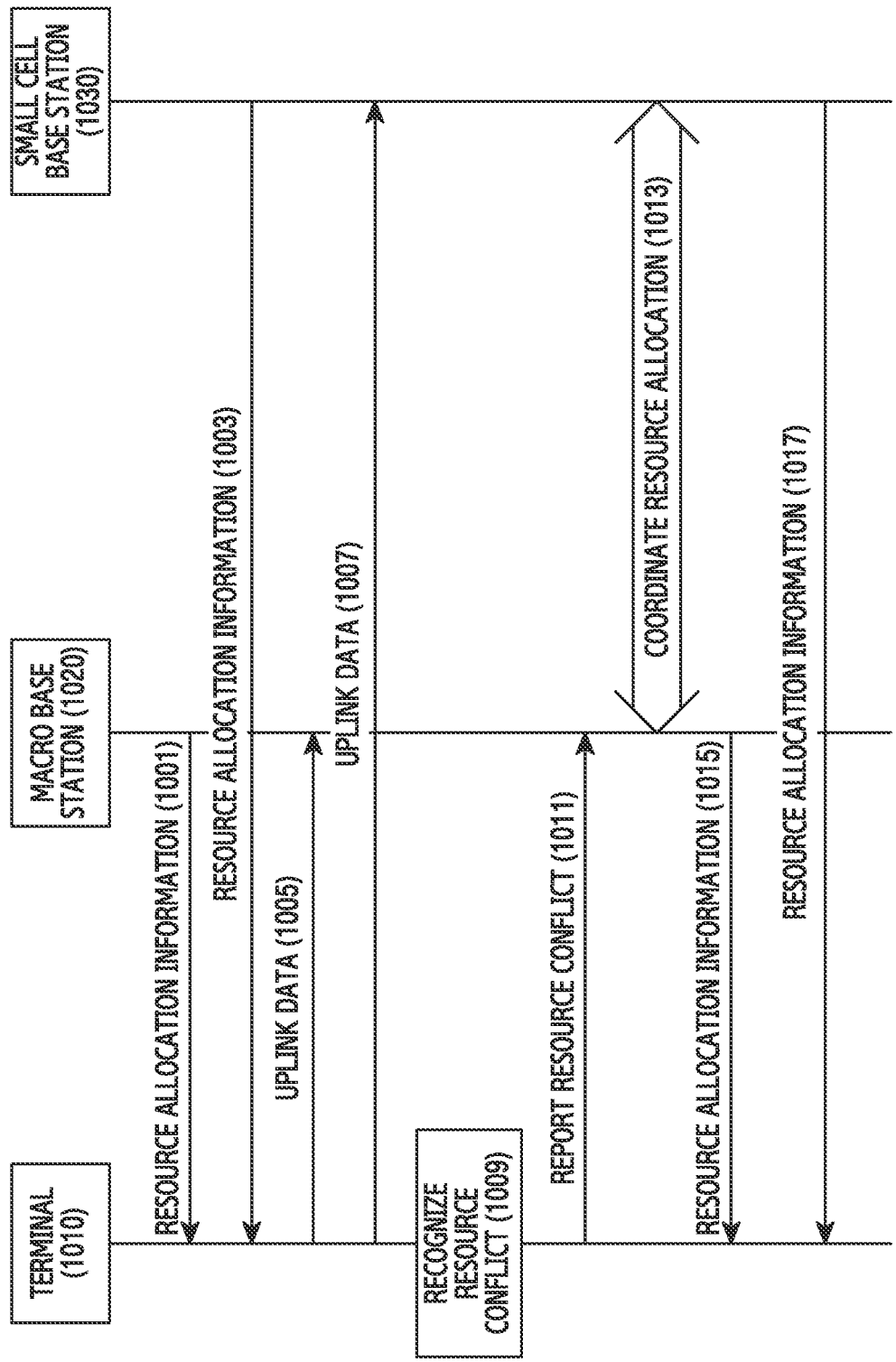
FIG. 10 is a diagram illustrating a signal exchange for processing a conflict of resource allocation in a wireless communication system according to an exemplary embodiment of the present invention.

FIG. 10 illustrates a signal exchange for processing a conflict of resource allocation in a wireless communication system according to an exemplary embodiment of the present invention.

Referring to the FIG. 10, in step 1001, the terminal 1010 receives resource allocation information from the macro base station 1020 and, in step 1003, receives resource allocation information from the small cell base station 1030. Thereafter, in step 1005, the terminal 1010 transmits uplink data to the macro base station 1020 through a resource checked by the resource allocation information. In step 1007, the terminal 1010 transmits uplink data to the small cell base station 1030 through a resource checked by the resource allocation information.

In step 1009, the terminal 1010 recognizes that a conflict between resource regions allocated by the macro base station 1020 and the small cell base station 1030 occurs. The conflict represents a case in which all of the resource allocated by the macro base station 1020 and the resource allocated by the small cell base station 1030 cannot be used due to a cell switching time of the terminal 1010. The conflict may be detected by recognizing a failure of uplink data transmission, or be detected by comparing a resource empty and an actually allocated resource.

In step 1011, the terminal 1010 reports the occurrence of the conflict between the resource regions to the macro base station 1020. Accordingly to this, the macro base station 1020 may recognize the conflict. In accordance with another exemplary embodiment of the present invention, the macro base station 1020 or the small cell base station 1030 may directly detect the conflict by recognizing that uplink data is not normally received from the terminal 1010. That the uplink data is not normally received represents a case of conflicting with uplink data from other terminal or a case in which data is not received in a region allocated to the terminal 1010.

In step 1013, the macro base station 1020 and the small cell base station 1030 coordinate resource allocation for the terminal 1010. For this, the macro base station 1020 and the small cell base station 1030 may exchange information of a required resource amount, an available resource amount, a position (e.g., frame, subframe, symbol/slot/sub channel position, etc.) of a resource to be actually allocated, etc. Through this, the macro base station 1020 and the small cell base station 1030 redetermine the cell switching time of the terminal 1010. To redetermine the cell switching time, the macro base station 1020 and the small cell base station 1030 may further perform a procedure for acquiring at least one of a switching delay time with the terminal 1010, TA information. And, the macro base station 1020 and the small cell base station 1030 again determine a resource empty on the basis of the redetermined cell switching time. In accordance with one exemplary embodiment of the present invention, information on the resource empty may be forwarded even to the terminal 1010. If the macro base station 1020 and the small cell base station 1030 are network entities belonging to different systems, information provided between the macro base station 1020 and the small cell base station 1030 may be transmitted after being processed into a form interpretable at a reception side, or the reception side may have a capability capable of interpreting a format of a transmission side system. Or, a third entity for processing of the information exists, and the third entity may process and forward the information.

In step 1015, the macro base station 1020 allocates a resource for the terminal 1010 in consideration of the cell switching time of the terminal 1010, a resource state, and transmits resource allocation information.

In step 1017, the small cell base station 1030 allocates a resource for the terminal 1010 in consideration of the cell switching time of the terminal 1010, a resource state, and transmits resource allocation information. At this time, in case that the resource empty is set in a resource of the small cell base station 1030, the small cell base station 1030 allocates a resource to the terminal 1010 in the remnant region excepting the resource empty. For example, if the resource empty is two subframes of an uplink region, the small cell base station 1030 allocates a resource to the terminal 1010 in the remnant region excepting two subframes of a front end of the uplink region.

Figure 11:
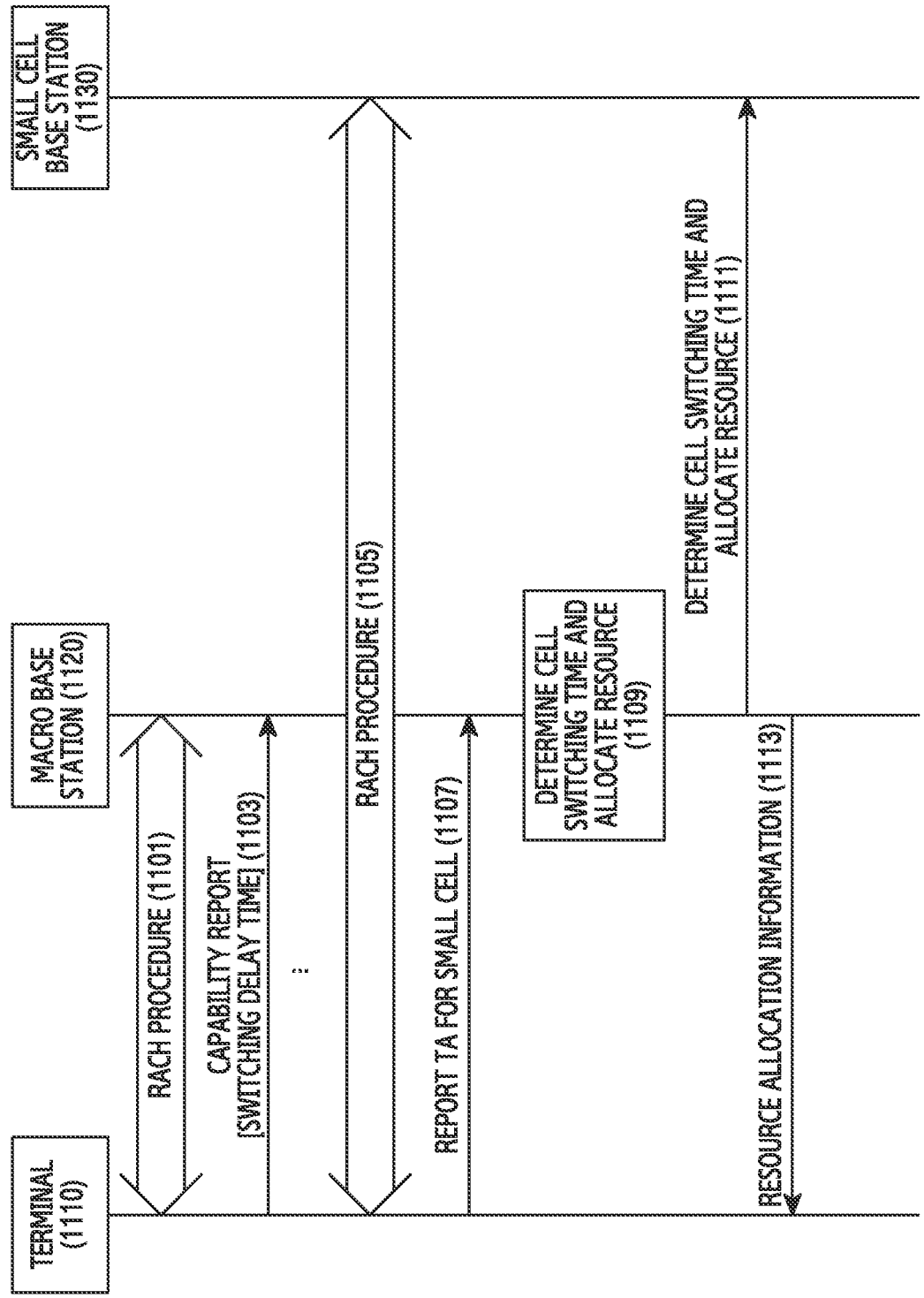
FIG. 11 is a diagram illustrating a signal exchange for resource use in a wireless communication system according to a further exemplary embodiment of the present invention.

FIG. 11 illustrates a signal exchange for resource use in a wireless communication system according to a further exemplary embodiment of the present invention.

Referring to the FIG. 11, in step 1101, a terminal 1110 performs an RACH procedure with a macro base station 1120 during an initial connection procedure. For example, the terminal 1110 selects a resource for random access, and transmits a random access preamble, and then receives a random access response from the macro base station 1120. Through the RACH procedure, the terminal 1110 and the macro base station 1120 may acquire TA information on the macro base station 1120. For example, the macro base station 1120 estimates a transmission timing of the terminal 1110 using the random access preamble, and transmits a TA command related to a TA through the random access response.

In step 1103, the terminal 1110 transmits capability information including a switching delay time to the macro base station 1120. The capability information may include information on other hardware, software capability besides the switching delay time. In accordance with another exemplary embodiment of the present invention, the switching delay time may be forwarded through a separate procedure or a separate message.

In step 1105, if a small cell base station 1130 the terminal 1110 is to connect is determined, the terminal 1110 performs an RACH procedure so as to connect to the small cell base station 1130. For example, the terminal 1110 selects a resource for random access, and transmits a random access preamble, and then receives a random access response from the macro base station 1120. Through the RACH procedure, the terminal 1110 and the macro base station 1120 may acquire TA information on the small cell base station 1130. For example, the small cell base station 1130 estimates a transmission timing of the terminal 1110 using the random access preamble, and transmits a TA command related to a TA through the random access response.

In step 1107, the terminal 1110 reports the TA information on the small cell base station 1130 to the macro base station 1120. Here, the TA information may directly or indirectly express, by the unit of time, resource, etc., a difference of time between a time point of transmission in the terminal 1110 and a time point of reception in the small cell base station 1130.

In step 1109, the macro base station 1120 determines a cell switching time based on a switching delay time of the terminal 1110 and TAs, and determines a resource empty on the basis of the cell switching time, and then allocates a resource to the terminal 1110 in consideration of the cell switching time of the terminal 1110 and resource states of the two base stations 1120, 1130. At this time, the macro base station 1120 allocates even a resource of a small cell as well as a resource of the macro cell.

In step 1111, the macro base station 1120 provides a resource allocation result to the small cell base station 1130. The resource allocation result includes resource empty information. At this time, the resource allocation result provided to the small cell base station 1130 may include only an allocation result of the resource of the small cell. In accordance with one exemplary embodiment of the present invention, the resource empty information may be forwarded even to the terminal 1110. For example, the resource empty information may be provided as a part of resource allocation information provided to the terminal 1110. If the macro base station 1120 and the small cell base station 1130 are network entities belonging to different systems, information provided from the macro base station 1120 to the small cell base station 1130 may be transmitted after being processed into a form interpretable in the small cell base station 1130, or the small cell base station 1130 may have a capability capable of interpreting a format of a system which the macro base station 1120 belongs to. Or, a third entity for processing of the information exists, and the third entity may process and forward the information.

In step 1113, the macro base station 1120 transmits resource allocation information on the macro cell and the small cell to the terminal 1110. Thereafter, though not illustrated in the FIG. 11, the terminal 1110 performs communication with the macro base station 1120 and the small cell base station 1130 through a resource checked by the resource allocation information.

Figure 12:
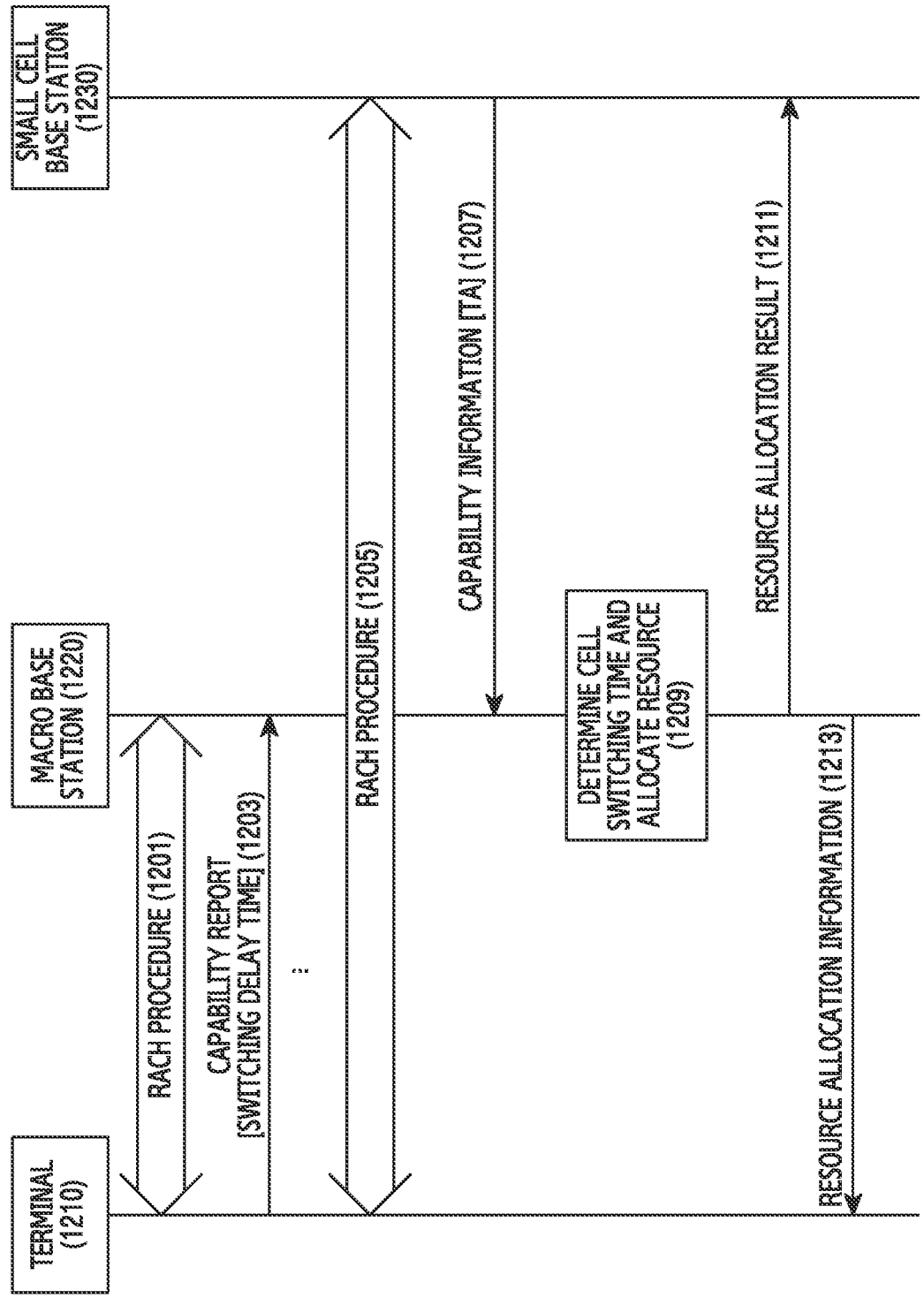
FIG. 12 is a diagram illustrating a signal exchange for resource use in a wireless communication system according to a yet another exemplary embodiment of the present invention.

FIG. 12 illustrates a signal exchange for resource use in a wireless communication system according to a yet another exemplary embodiment of the present invention.

Referring to the FIG. 12, in step 1201, a terminal 1210 performs an RACH procedure with a macro base station 1220 during an initial connection procedure. For example, the terminal 1210 selects a resource for random access, and transmits a random access preamble, and then receives a random access response from the macro base station 1220. Through the RACH procedure, the terminal 1210 and the macro base station 1220 may acquire TA information on the macro base station 1220. For example, the macro base station 1220 estimates a transmission timing of the terminal 1210 using the random access preamble, and transmits a TA command related to a TA through the random access response.

In step 1203, the terminal 1210 transmits capability information including a switching delay time to the macro base station 1220. The capability information may include information on other hardware, software capability besides the switching delay time. In accordance with another exemplary embodiment of the present invention, the switching delay time may be forwarded through a separate procedure or a separate message.

In step 1205, if a small cell base station 1230 the terminal 1210 is to connect is determined, the terminal 1210 performs an RACH procedure so as to connect to the small cell base station 1230. For example, the terminal 1210 selects a resource for random access, and transmits a random access preamble, and then receives a random access response from the macro base station 1220. Through the RACH procedure, the terminal 1210 and the macro base station 1220 may acquire TA information on the small cell base station 1230. For example, the small cell base station 1230 estimates a transmission timing of the terminal 1210 using the random access preamble, and transmits a TA command related to a TA through the random access response.

In step 1207, the small cell base station 1230 reports the TA information on the small cell base station 1230 to the macro base station 1220. Here, the TA information may directly or indirectly express, by the unit of time, resource, etc., a difference of time between a time point of transmission in the terminal 1210 and a time point of reception in the small cell base station 1230.

In step 1209, the macro base station 1220 determines a cell switching time based on a switching delay time of the terminal 1210 and TAs, and determines a resource empty on the basis of the cell switching time, and then allocates a resource to the terminal 1210 in consideration of the cell switching time of the terminal 1210 and resource states of the two base stations 1220, 1230. At this time, the macro base station 1220 allocates even a resource of a small cell as well as a resource of the macro cell.

In step 1211, the macro base station 1220 provides a resource allocation result to the small cell base station 1230. The resource allocation result includes resource empty information. At this time, the resource allocation result provided to the small cell base station 1230 may include only an allocation result of the resource of the small cell. In accordance with one exemplary embodiment of the present invention, the resource empty information may be forwarded even to the terminal 1210. If the macro base station 1220 and the small cell base station 1230 are network entities belonging to different systems, information provided from the macro base station 1220 to the small cell base station 1230 may be transmitted after being processed into a form interpretable in the small cell base station 1230, or the small cell base station 1230 may have a capability capable of interpreting a format of a system which the macro base station 1220 belongs to. Or, a third entity for processing of the information exists, and the third entity may process and forward the information.

In step 1213, the macro base station 1220 transmits resource allocation information on the macro cell and the small cell to the terminal 1210. Thereafter, though not illustrated in the FIG. 12, the terminal 1210 performs communication with the macro base station 1220 and the small cell base station 1230 through a resource checked by the resource allocation information.

Unlike the exemplary embodiments illustrated in the FIG. 11 and the FIG. 12, resource allocation information for a terminal may be transmitted by each of the macro cell and the small cell. In this case, the terminal should monitor the macro cell and the small cell, although not performing data transmission/reception with the macro cell or the small cell.

However, in case that the terminal monitors while switching between the macro cell and the small cell, a situation in which the terminal unnecessarily switches to monitor resource allocation though not performing communication with the base station may occur. Accordingly, a separate indicator may be used in order for the terminal to monitor resource allocation information in the macro cell and the small cell. Exemplary embodiments related to the indication are described with reference to FIG. 13 below and FIG. 14 below.

Figure 13:
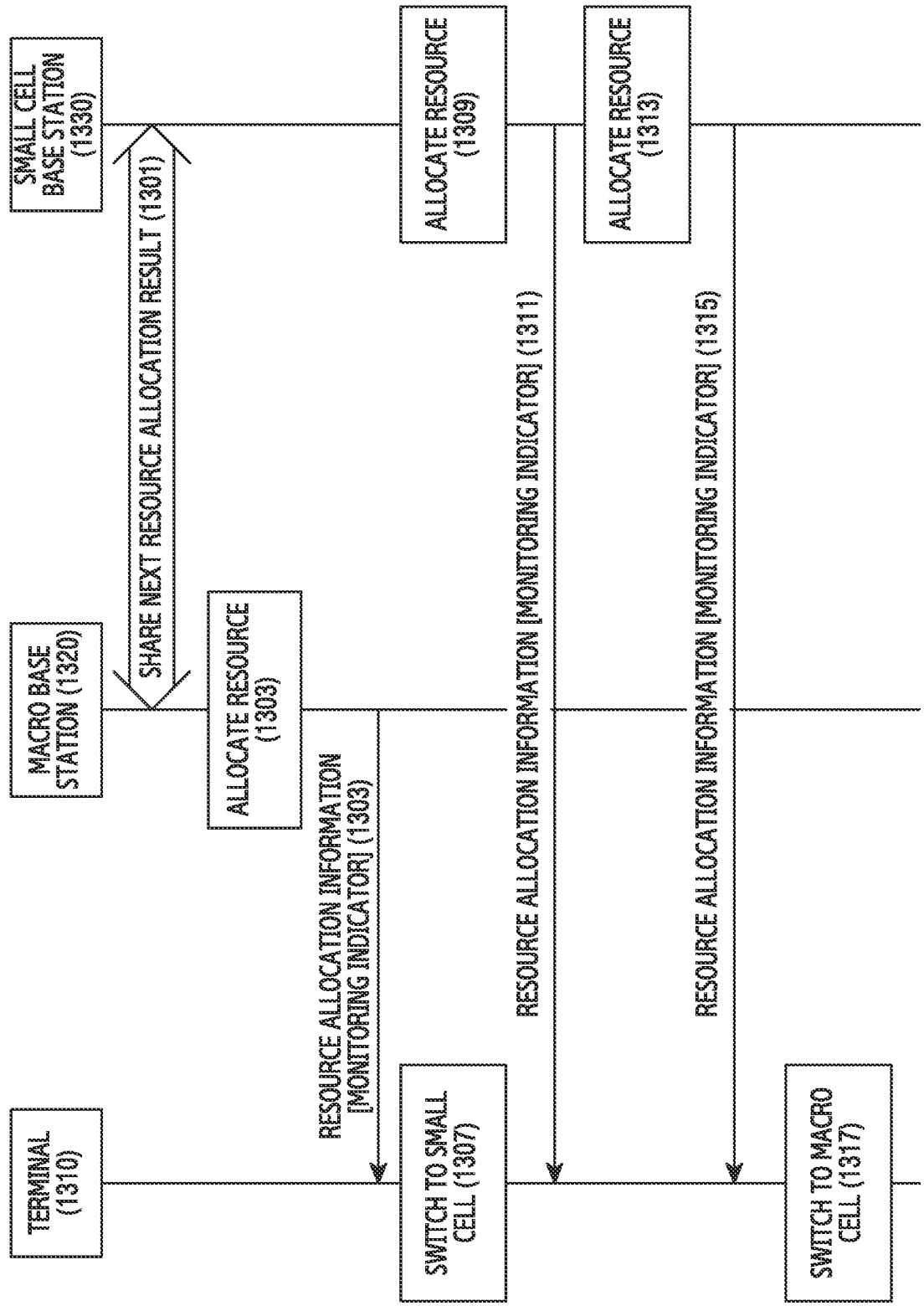
FIG. 13 is a diagram illustrating a signal exchange for resource allocation monitoring in a wireless communication system according to an exemplary embodiment of the present invention.

FIG. 13 illustrates a signal exchange for resource allocation monitoring in a wireless communication system according to an exemplary embodiment of the present invention.

Referring to the FIG. 13, although not illustrated, a terminal 1310 is in a state of monitoring resource allocation information of a macro base station 1320 while transmitting/receiving data.

In step 1301, the macro base station 1320 and a small cell base station 1330 share a resource allocation result for the terminal 1310. That is, the macro base station 1320 and small cell base station 1330 exchange the resource allocation result for the terminal 1310. Through this, the macro base station 1320 and the small cell base station 1330 may determine whether the terminal 1310 performs communication with the macro base station 1320, or whether it performs communication with the small cell base station 1330, or whether it performs communication with all of the two base stations 1320, 1330. The aforementioned determination about the communication counterpart of the terminal 1310 may be carried out at the time of configuring the resource allocation information for the terminal 1310, and may be performed every scheduling time or at an interval of a plurality of scheduling time in accordance with a certain period. If the macro base station 1320 and the small cell base station 1330 are network entities belonging to different systems, information provided between the macro base station 1320 and the small cell base station 1330 may be transmitted after being processed into a form interpretable at a reception side, or the reception side may have a capability capable of interpreting a format of a transmission side system. Or, a third entity for processing of the information exists, and the third entity may process and forward the information.

In step 1303, the macro base station 1320 allocates a resource to the terminal 1310. At this time, the macro base station 1320 may consider a cell switching time of the terminal 1310.

In step 1305, the macro base station 1320 transmits resource allocation information to the terminal 1310. At this time, the macro base station 1320 determines a time point at which the small cell base station 1330 is to transmit resource allocation information, and transmits resource allocation information including a monitoring indicator indicating to receive the resource allocation information of the small cell base station 1330 to the terminal 1310. In accordance with another exemplary embodiment of the present invention, the monitoring indicator may be transmitted through other message or separate signaling, not the resource allocation information.

In step 1307, the terminal 1310 switches to the small cell base station 1330. In detail, the terminal 1310 changes an operation frequency of an RF (Radio Frequency) module from a frequency of the macro base station 1320 to a frequency of the small cell base station 1330. Or, the terminal 1310 changes an operation channel of the RF module from a channel of the macro base station 1320 to a channel of the small cell base station 1330. At this time, it is not required to release a logical connectivity between the terminal 1310 and the macro base station 1320.

In step 1309, the small cell base station 1330 allocates a resource to the terminal 1310. At this time, the small cell base station 1330 considers a cell switching time of the terminal 1310. That is, the small cell base station 1330 allocates the resource in the remnant region excepting a resource empty for the terminal 1310.

In step 1311, the small cell base station 1330 transmits resource allocation information to the terminal 1310. At this time, the resource allocation information includes a monitoring indicator indicating to keep receiving the resource allocation information of the small cell base station 1330.

In step 1313, the small cell base station 1330 allocates a resource to the terminal 1310. At this time, the small cell base station 1330 considers a cell switching time of the terminal 1310. That is, the small cell base station 1330 allocates the resource in the remnant region excepting a resource empty for the terminal 1310.

In step 1315, the small cell base station 1330 transmits resource allocation information to the terminal 1310. At this time, the small cell base station 1330 determines that a resource is to be allocated from the macro base station 1320 to the terminal 1310, and transmits resource allocation information including a monitoring indicator indicating to keep receiving resource allocation information of the macro base station 1320. Although not illustrated in the FIG. 13, the small cell base station 1330 may exchange the resource allocation information with the macro base station 1320 in order to determine a base station to service the terminal 1310.

In step 1317, the terminal 1310 switches to the macro base station 1320. In detail, the terminal 1310 changes an operation frequency of an RF module from a frequency of the small cell base station 1330 to a frequency of the macro base station 1320. Or, the terminal 1310 changes an operation channel of the RF module from a channel of the small cell base station 1330 to a channel of the macro base station 1320. At this time, a logical connectivity between the terminal 1310 and the small cell base station 1330 is not released. Accordingly to this, the terminal 1310 may monitor the resource allocation information transmitted by the macro base station 1320.

In case of some of the aforementioned exemplary embodiments, each base station allocates a resource of its own cell, and transmits resource allocation information. In contrast, in case of other some exemplary embodiments, one base station allocates resources of all cells, and transmits resource allocation information of all the cells. A scheme of resource allocation and resource allocation information transmission may be determined by backhaul latency.

The backhaul latency represents a time required for signal forwarding at communication through a backhaul link between base stations. In case that a macro base station schedules a resource of a small cell base station, the macro base station should acquire information on the small cell base station. For example, information necessary for scheduling includes an available resource amount of the small cell base station, the number of connected terminals, a channel state with a terminal which should be allocated a resource, a required communication quality (e.g., a transmission quantity, an MCS level, etc.), a position of a resource allocated to a terminal, etc.

Accordingly, if a time required for collect information necessary for scheduling for a terminal is too long, it is desirable that base stations each transmit resource allocation information. In case that the base stations each transmit the resource allocation information, the terminal should monitor the plurality of base stations. If only one base station intends to transmit resource allocation information in order to prevent this, the time required for the base station transmitting the resource allocation information to collect information necessary for scheduling from other base stations should not be long. Therefore, if the backhaul latency is long and thus the time required to collect the information necessary for the scheduling becomes long, it is desirable that the base stations each transmit the resource allocation information. In contrast, if the backhaul latency is not long and thus the time required to collect the information necessary for the scheduling is not long, one base station may collect the information necessary for the scheduling, and schedule all of its own resource and resources of other base stations, and then transmit the resource allocation information to a terminal.

Figure 14:
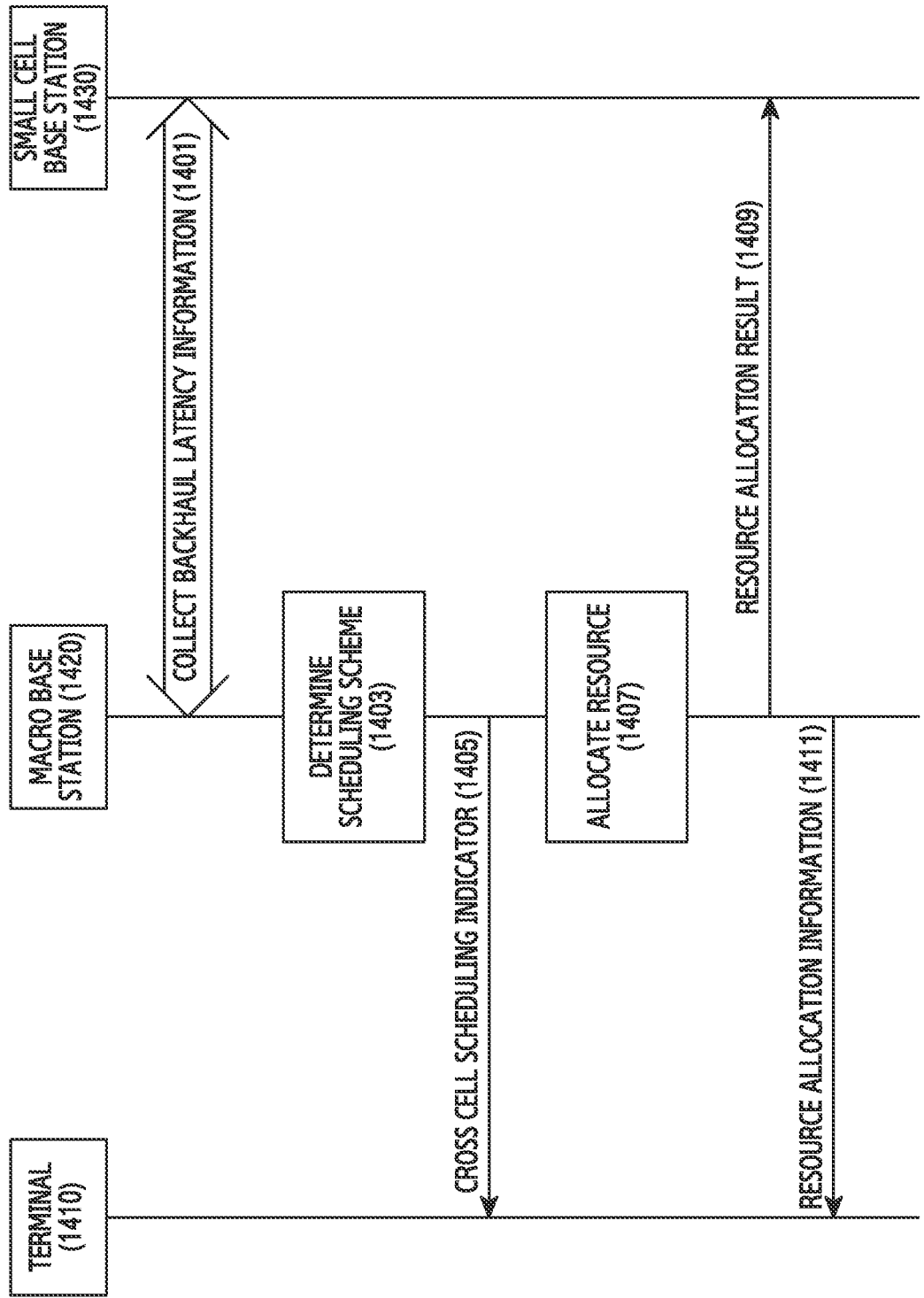
FIG. 14 is a diagram illustrating a signal exchange for scheduling type determination in a wireless communication system according to an exemplary embodiment of the present invention.

FIG. 14 illustrates a signal exchange for scheduling type determination in a wireless communication system according to an exemplary embodiment of the present invention.

Referring to the FIG. 14, in step 1401, a macro base station 1420 collects backhaul latency information with a small cell base station 1430, so as to determine a base station to transmit resource allocation information for a terminal 1410. For example, the macro base station 1420 transmits a test signal for a communication state test, and measures a response time to the test signal, thereby being capable of measuring the backhaul latency. If the macro base station 1420 and the small cell base station 1430 are network entities belonging to different systems, information provided between the macro base station 1420 and the small cell base station 1430 may be transmitted after being processed into a form interpretable at a reception side, or the reception side may have a capability capable of interpreting a format of a transmission side system. Or, a third entity for processing of the information exists, and the third entity may process and forward the information.

In step 1403, the macro base station 1420 and the small cell base station 1430 determine a scheduling type for the terminal. The scheduling type represents whether one base station transmits resource allocation information of a plurality of cells, or whether base stations each transmit. The scheduling type may be determined on the basis of the backhaul latency between the macro base station 1420 and the small cell base station 1430. In case of the present exemplary embodiment, a 'cross cell scheduling' scheme in which one base station transmits resource allocation information is selected.

In step 1405, the macro base station 1420 indicates a resource allocation information monitoring type to the terminal 1410. In other words, the macro base station 1420 transmits an indicator indicating the scheduling type determined in the step 1403, i.e., a cross cell scheduling indicator. The cross cell scheduling indicates to monitor resource allocation information from the macro base station 1420. Accordingly to this, at duration not transmitting/receiving a signal, the terminal 1410 may exclude cell switching for monitoring of resource allocation information. The cross cell scheduling indicator may be included and transmitted in the resource allocation information, or be transmitted through an L2 (layer-2) message.

In step 1407, the macro base station 1420 allocates a resource to the terminal 1410. The macro base station 1420 allocates even a resource of a small cell as well as a resource of the macro cell. For this, the macro base station 1420 may collect information on the small cell base station 1430 necessary for scheduling the resource of the small cell through a backhaul link. At this time, the macro base station 1420 considers a cell switching time of the terminal 1410.

In step 1409, the macro base station 1420 provides a resource allocation result to the small cell base station 1430. The resource allocation result includes information indicating a position and size of the resource allocated to the terminal 1410 among the resource of the small cell, and may further include resource empty information. If the macro base station 1420 and the small cell base station 1430 are network entities belonging to different systems, information provided from the macro base station 1420 to the small cell base station 1430 may be transmitted after being processed into a form interpretable in the small cell base station 1430, or the small cell base station 1430 may have a capability capable of interpreting a format of a system which the macro base station 1420 belongs to. Or, a third entity for processing of the information exists, and the third entity may process and forward the information.

In step 1411, the macro base station 1420 transmits resource allocation information on the macro cell and the small cell to the terminal 1410. Thereafter, although not illustrated in the FIG. 14, the macro base station 1420 and the small cell base station 1430 continuously observe backhaul latency information, and determine whether the scheduling type of the terminal 1410 should be changed in accordance with a change of the backhaul latency.

Figure 15:
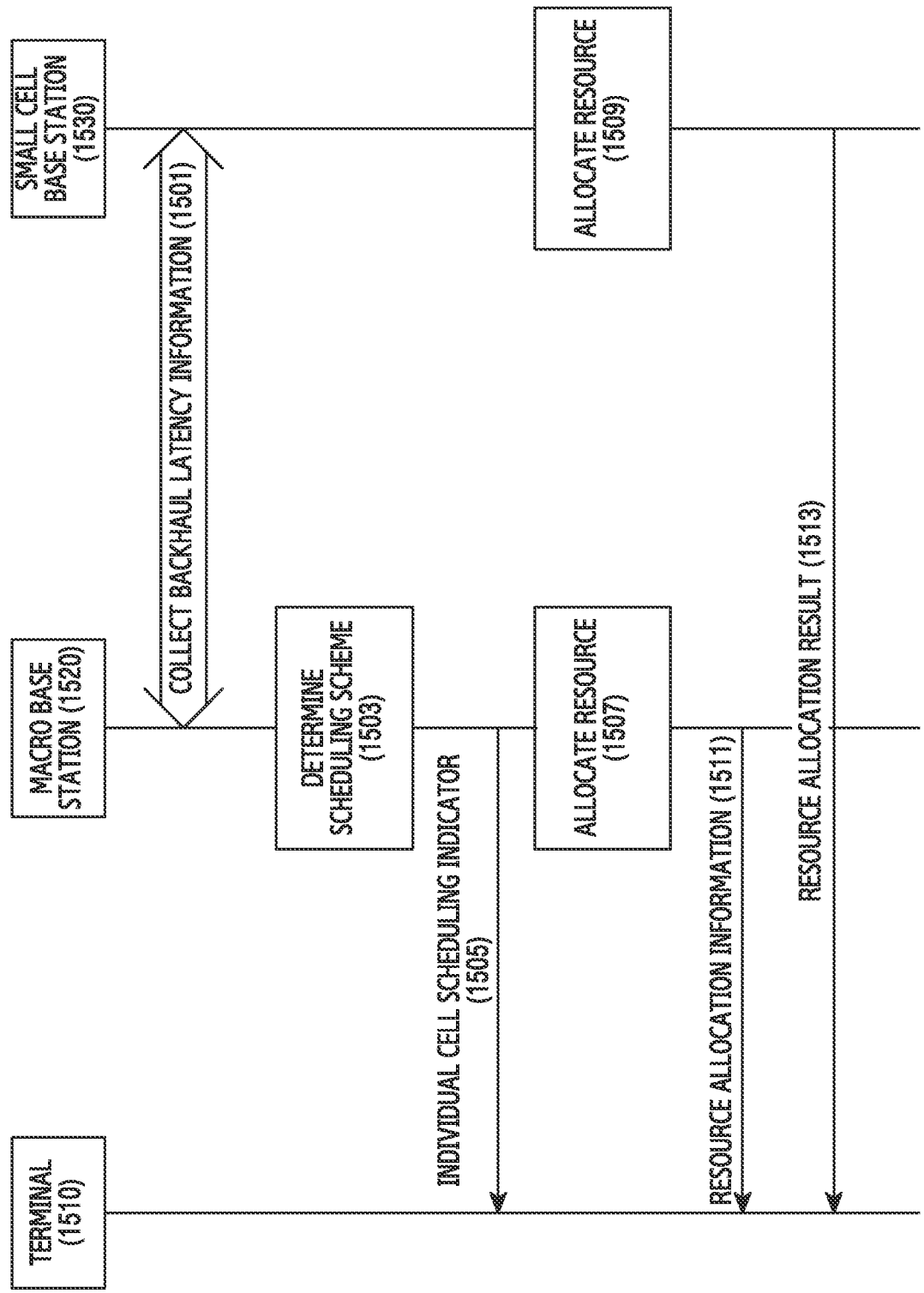
FIG. 15 is a diagram illustrating a signal exchange for scheduling type determination in a wireless communication system according to another exemplary embodiment of the present invention.

FIG. 15 illustrates a signal exchange for scheduling type determination in a wireless communication system according to another exemplary embodiment of the present invention.

Referring to the FIG. 15, in step 1501, a macro base station 1520 collects backhaul latency information with a small cell base station 1530, in order to determine a base station to transmit resource allocation information for a terminal 1510. For example, the macro base station 1520 transmits a test signal for a communication state test, and measures a response time to the test signal, thereby being capable of measuring the backhaul latency. If the macro base station 1520 and the small cell base station 1530 are network entities belonging to different systems, information provided between the macro base station 1520 and the small cell base station 1530 may be transmitted after being processed into a form interpretable at a reception side, or the reception side may have a capability capable of interpreting a format of a transmission side system. Or, a third entity for processing of the information exists, and the third entity may process and forward the information.

In step 1503, the macro base station 1520 and the small cell base station 1530 determine a scheduling type for the terminal. Here, the scheduling type represents whether one base station transmits resource allocation information of a plurality of cells, or whether base stations each transmit. The scheduling type may be determined on the basis of backhaul latency between the macro base station 1520 and the small cell base station 1530. In case of the present exemplary embodiment, a 'cross cell scheduling' scheme in which one base station transmits resource allocation information is selected.

In step 1505, the macro base station 1520 indicates a resource allocation information monitoring type to the terminal 1510. In other words, the macro base station 1520 transmits an indicator indicating the scheduling type determined in the step 1503, i.e., an individual cell scheduling indicator. The individual cell scheduling indicates to monitor resource allocation information from the macro base station 1520 and resource allocation information from the small cell base station 1530. The individual cell scheduling indicator may be included and transmitted in the resource allocation information, or be transmitted through an L2 message.

In step 1507, the macro base station 1520 allocates a resource to the terminal 1510. The macro base station 1520 allocates a resource of the macro cell. At this time, the macro base station 1520 considers a cell switching time of the terminal 1510.

In step 1509, the small cell base station 1530 allocates a resource to the terminal 1510. The small cell base station 1530 allocates a resource of the small cell. At this time, the small cell base station 1530 considers a cell switching time of the terminal 1510.

In step 1511, the macro base station 1520 transmits resource allocation information on the macro cell to the terminal 1510. In step 1513, the small cell base station 1530 transmits resource allocation information on the small cell to the terminal 1510. Thereafter, although not illustrated in the FIG. 15, the macro base station 1520 and the small cell base station 1530 continuously observe backhaul latency information, and determine whether the scheduling type of the terminal 1510 should be changed in accordance with a change of the backhaul latency.

Figure 16:
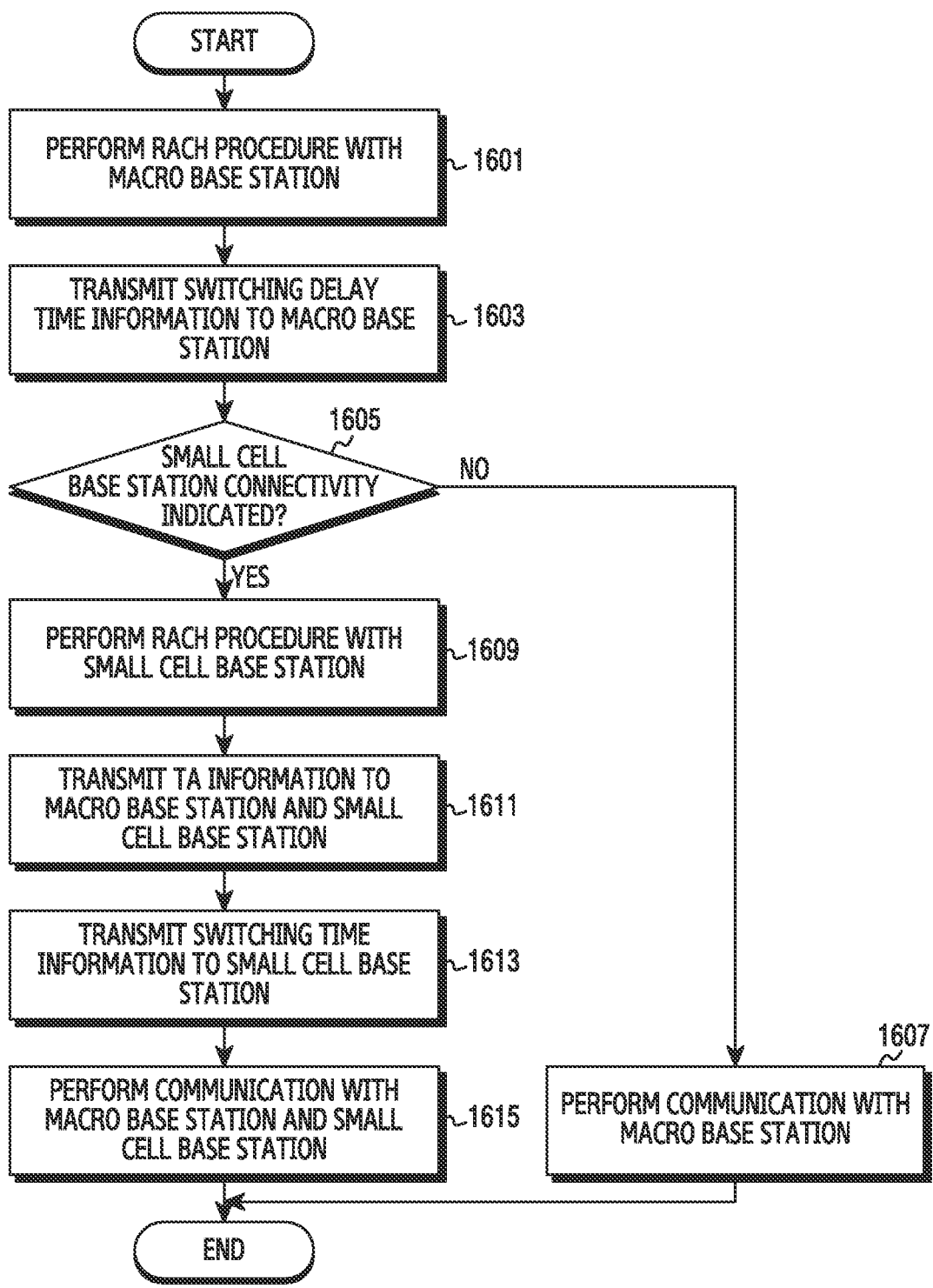
FIG. 16 is a diagram illustrating an operation procedure of a terminal in a wireless communication system according to an exemplary embodiment of the present invention.

FIG. 16 illustrates an operation procedure of a terminal in a wireless communication system according to an exemplary embodiment of the present invention.

Referring to the FIG. 16, in step 1601, the terminal initiates an initial connection procedure through a macro base station, and performs an RACH procedure with the macro base station. Through the RACH procedure, the terminal may acquire TA information on the macro base station.

After performing the RACH procedure, the terminal proceeds to step 1603 and transmits a switching delay time of the terminal to the macro base station. The switching delay time may be transmitted as a part of capability information of the terminal. The capability information may include information on other hardware, software capability besides the switching delay time. In accordance with another exemplary embodiment of the present invention, the switching delay time may be forwarded through a separate procedure or a separate message.

Thereafter, the terminal proceeds to step 1605 and determines if a connectivity to a small cell base station is indicated by the macro base station. The connectivity to the small cell base station is indicated in case that it is determined that the small cell base station is to service the terminal. Service provision or non-provision of the small cell base station may be determined by the macro base station on the basis of a wireless channel quality of the terminal, a network resource present condition, etc.

If the connectivity to the small cell base station is not indicated from the macro base station, the terminal proceeds to step 1607 and performs communication with the macro base station. That is, the terminal receives resource allocation information from the macro base station, receives a downlink signal through an allocated resource, and transmits an uplink signal.

In contrast, if the connectivity to the small cell base station is indicated from the macro base station, the terminal proceeds to step 1609 and performs an RACH procedure with the small cell base station. Through the RACH procedure, the terminal may acquire TA information on the small cell base station.

Next, the terminal proceeds to step 1611 and transmits TA information to the macro base station and the small cell base station. At this time, the terminal transmits the TA information on the small cell base station to the macro base station, the TA information on the macro base station to the small cell base station. The TA information may directly or indirectly express, by the unit of time, resource, etc., a difference of time between a time point of transmission in the terminal and a time point of reception in the macro base station. However, in accordance with another exemplary embodiment of the present invention, the step 1611 may be omitted. In this case, the macro base station and the small cell base station mutually exchange the TA information.

Next, the terminal proceeds to step 1613 and reports a switching delay time of the terminal to the small cell base station. The switching delay time may be transmitted as a part of capability information of the terminal. However, in accordance with another exemplary embodiment of the present invention, the step 1613 may be omitted. In this case, the macro base station provides switching delay time information of the terminal to the small cell base station.

Thereafter, the terminal proceeds to step 1615 and performs communication with the macro base station and the small cell base station. That is, the terminal receives resource allocation information of the macro base station and the small cell base station, and performs communication with the macro base station and the small cell base station in accordance with the resource allocation information. Here, the resource allocation information may be received from each of the macro base station and the small cell base station, or be received from the macro base station only. The resource allocation information includes information indicating a position and size of a resource allocated to the terminal, and may further include at least one of a resource empty, a CP (Cyclic Prefix) length, a scheduling type indicator, a monitoring indicator. In case that performing the communication with the macro base station and the small cell base station, the terminal may perform cell switching according to cases.

Figure 17:
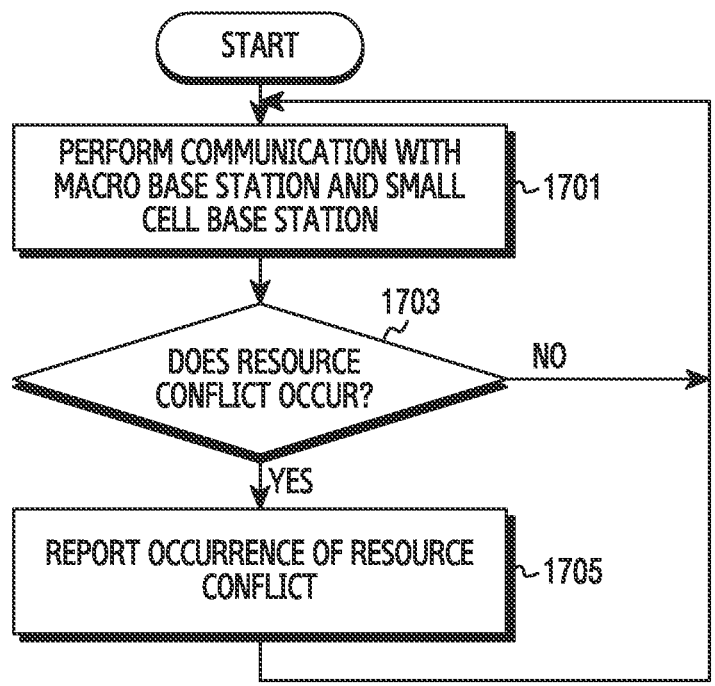
FIG. 17 is a diagram illustrating an operation procedure of a terminal in a wireless communication system according to another exemplary embodiment of the present invention.

FIG. 17 illustrates an operation procedure of a terminal in a wireless communication system according to another exemplary embodiment of the present invention.

Referring to the FIG. 17, in step 1701, the terminal performs communication with a macro base station and a small cell base station. That is, the terminal receives resource allocation information of the macro base station and the small cell base station, and performs communication with the macro base station and the small cell base station in accordance with the resource allocation information. According to cases, the terminal may perform cell switching.

While performing the communication, the terminal proceeds to step 1703 and determines if a conflict between resource regions of the macro base station and the small cell base station allocated to the terminal occurs. For example, the terminal recognizes a failure of uplink data transmission or compares a resource empty and an actually allocated resource, thereby being capable of detecting the conflict.

In case that the conflict occurs, the terminal proceeds to step 1705 and reports, to the macro base station, the occurrence of the conflict. For example, the terminal transmits a separate message, signal sequence defined for the conflict report. The terminal may transmit the signal sequence through a feedback channel.

Thereafter, the terminal returns to the step 1701 and performs communication. At this time, although not illustrated in the FIG. 17, the terminal may receive changed resource allocation information from the macro base station. The resource allocation information includes information indicating a position and size of a resource allocated to the terminal, and may further include at least one of a resource empty, a CP length, a scheduling type indicator, a monitoring indicator.

Figure 18:
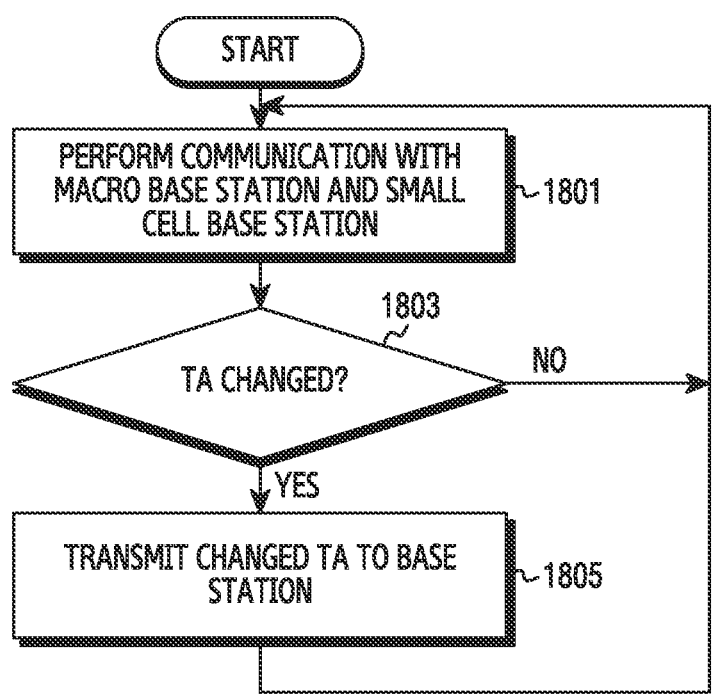
FIG. 18 is a diagram illustrating an operation procedure of a terminal in a wireless communication system according to a further exemplary embodiment of the present invention.

FIG. 18 illustrates an operation procedure of a terminal in a wireless communication system according to a further exemplary embodiment of the present invention.

Referring to the FIG. 18, in step 1801, the terminal performs communication with a macro base station and a small cell base station. That is, the terminal receives resource allocation information of the macro base station and the small cell base station, and performs communication with the macro base station and the small cell base station in accordance with the resource allocation information. According to cases, the terminal may perform cell switching.

While performing the communication, the terminal proceeds to step 1803 and determines if a TA for the macro base station or the small cell base station is changed. The TA may be changed as a distance with the macro base station or small cell base station is changed according to movement of the terminal.

If the TA for the macro base station or small cell base station is changed, the terminal proceeds to step 1805 and transmits the changed TA information to a corresponding base station. The changed TA information may express the changed TA itself, or express a difference value with previous TA. However, in accordance with another exemplary embodiment of the present invention, although the TA is changed, the terminal may not transmit the changed TA information. In this case, the changed TA information may be directly exchanged between the macro base station and the small cell base station.

Thereafter, the terminal returns to the step 1801 and performs communication. At this time, although not illustrated in the FIG. 18, the terminal may receive resource allocation information from at least one of the macro base station and the small cell base station. The resource allocation information includes information indicating a position and size of a resource allocated to the terminal, and may further include at least one of a resource empty, a CP length, a scheduling type indicator, a monitoring indicator.

Figure 19:
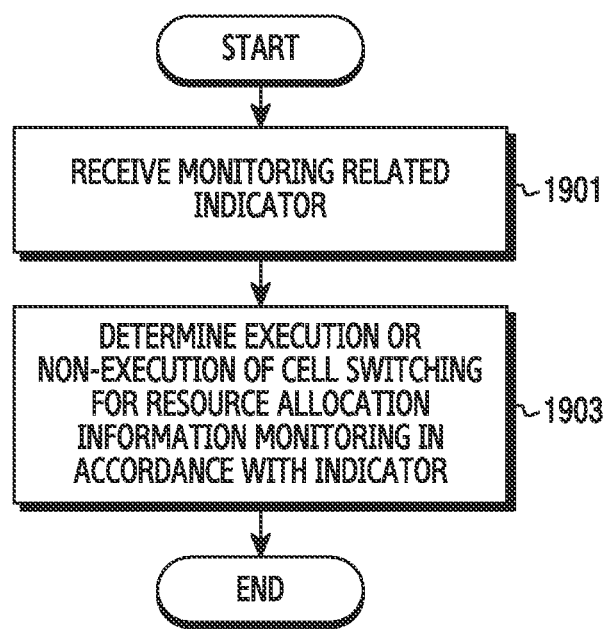
FIG. 19 is a diagram illustrating an operation procedure of a terminal in a wireless communication system according to a yet another exemplary embodiment of the present invention.

FIG. 19 illustrates an operation procedure of a terminal in a wireless communication system according to a yet another exemplary embodiment of the present invention.

Referring to the FIG. 19, in step 1901, the terminal receives a monitoring related indicator. The indicator may indicate at least one of need or non-need of cell switching for monitoring, a scheduling type. The scheduling type represents whether one base station transmits resource allocation information of a plurality of cells, or whether base stations each transmit. The indicator may be received together with resource allocation information.

After receiving the indicator, the terminal proceeds to step 1903 and determines execution or non-execution of cell switching for resource allocation information monitoring. For example, in case that the indicator indicates that a macro base station transmits resource allocation information of a plurality of cells, the terminal monitors resource allocation information of the macro base station, and determines to exclude the cell switching. For another example, in case that the indicator indicates that base stations each transmit the resource allocation information of the plurality of cells, the terminal determines to perform the cell switching so as to monitor resource allocation information transmitted by each of the base stations. At this time, the terminal may perform the cell switching in accordance with an indicator indicating that there is a need for the cell switching. That is, if the indicator indicates that there is not the need for the cell switching, the terminal may exclude the cell switching, although a resource allocation information transmission time point of other base station arrives.

Figure 20:
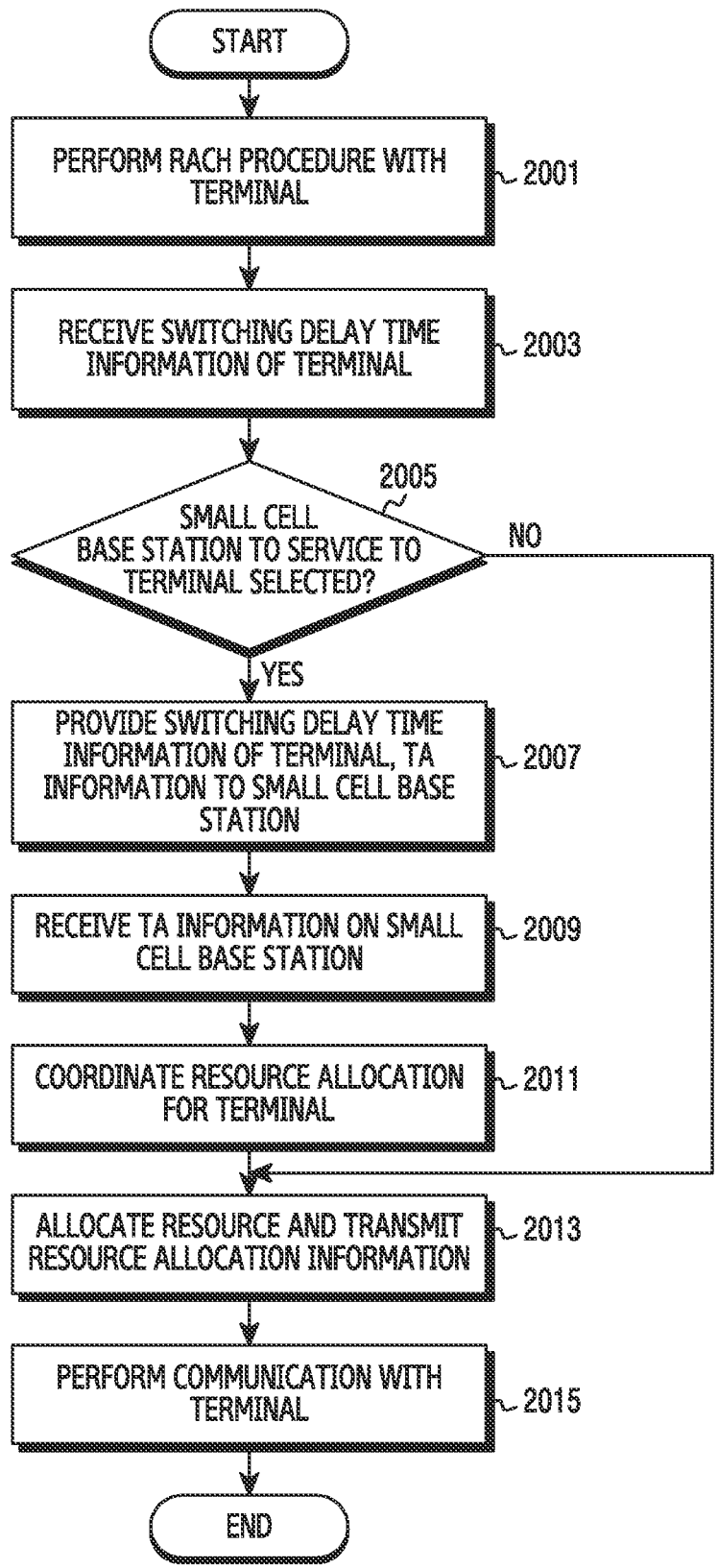
FIG. 20 is a diagram illustrating an operation procedure of a macro base station in a wireless communication system according to an exemplary embodiment of the present invention.

FIG. 20 illustrates an operation procedure of a macro base station in a wireless communication system according to an exemplary embodiment of the present invention.

Referring to the FIG. 20, in step 2001, the macro base station performs an RACH procedure with a terminal which performs an initial entry procedure. Through the RACH procedure, the macro base station may acquire TA information of the terminal.

After performing the RACH procedure, the macro base station proceeds to step 2003 and receives switching delay time information of the terminal from the terminal. The switching delay time information may be received as a part of capability information of the terminal. The capability information may include information on other hardware, software capability besides the switching delay time. In accordance with another exemplary embodiment of the present invention, the switching delay time may be forwarded through a separate procedure or a separate message.

Thereafter, the macro base station proceeds to step 2005 and determines whether to service the terminal together with a small cell base station. Service provision or non-provision of the small cell base station may be determined on the basis of a wireless channel quality of the terminal, a network resource present condition, etc. Also, the service provision or non-provision of the small cell base station may be determined in case that there is a request of the terminal. If it is determined not to service together with the small cell base station, the macro base station proceeds to step 2013 below.

In contrast, if it is determined to service together with the small cell base station, the macro base station proceeds to step 2007 and provides, to the small cell base station, a switching delay time of the terminal and TA information on the macro base station of the terminal. The TA information may directly or indirectly express, by the unit of time, resource, etc., a difference of time between a time point of transmission in the terminal and a time point of reception in the macro base station. However, in accordance with another exemplary embodiment of the present invention, the TA information of the terminal may not be provided by the small cell base station. In this case, the TA information on the macro base station is provided to the small cell base station by the terminal.

Thereafter, the macro base station proceeds to step 2009 and receives TA information on the small cell base station of the terminal. The TA information may directly or indirectly express, by the unit of time, resource, etc., a difference of time between a time point of transmission in the terminal and a time point of reception in the small cell base station. However, in accordance with an exemplary embodiment of the present invention, the TA information on the small cell base station may be provided from the small cell base station. In accordance with another exemplary embodiment of the present invention, the TA information on the small cell base station may be provided from the terminal.

Next, the macro base station proceeds to step 2011 and coordinates resource allocation for the terminal with the small cell base station. For this, the macro base station and the small cell base station may exchange information of a required resource amount, an available resource amount, a position of an actually allocated resource, etc. In detail, the macro base station determines a cell switching time of the terminal. The cell switching time is determined on the basis of a switching delay time of the terminal and TAs. And, the macro base station determines a resource empty for the terminal.

Thereafter, the macro base station proceeds to step 2013 and allocates a resource to the terminal, and transmits resource allocation information. At this time, in accordance with a scheduling type, the macro base station may allocate only a resource of a macro cell, or allocate all of the resource of the macro cell and a resource of a small cell. In case that allocating even the resource of the small cell, the macro base station may collect information of the small cell base station necessary for scheduling through a backhaul link.

After transmission of the resource allocation information, the macro base station proceeds to step 2015 and performs communication with the terminal. That is, the macro base station transmits a downlink signal and receives an uplink signal, through the resource of the macro cell allocated to the terminal.

Figure 21:
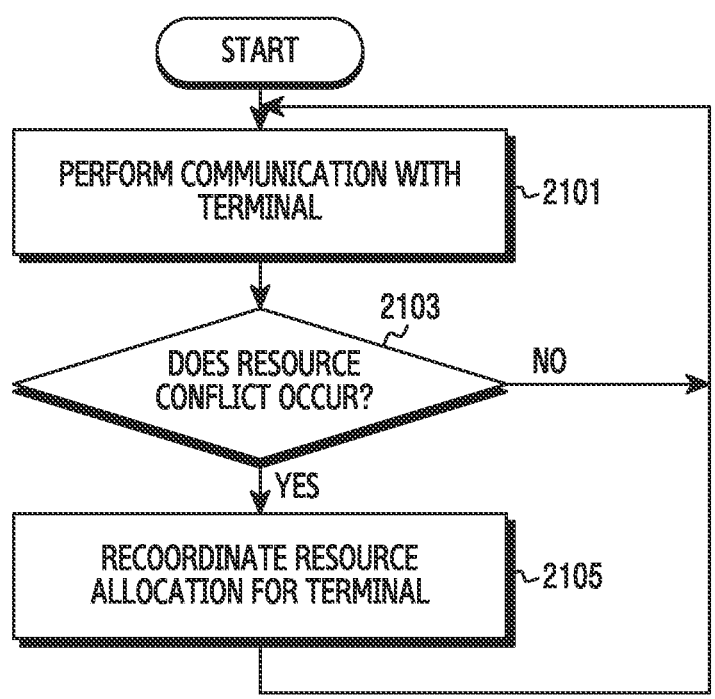
FIG. 21 is a diagram illustrating an operation procedure of a macro base station in a wireless communication system according to another exemplary embodiment of the present invention.

FIG. 21 illustrates an operation procedure of a macro base station in a wireless communication system according to another exemplary embodiment of the present invention.

Referring to the FIG. 21, in step 2101, the macro base station performs communication with a terminal. That is, the macro base station allocates a resource to the terminal, and transmits a downlink signal and receives an uplink signal, through the allocated resource.

While performing the communication with the terminal, the macro base station proceeds to step 2103 and determines if a conflict occurs between resource regions of the macro base station and a small cell base station allocated to the terminal. The occurrence or non-occurrence of the conflict may be determined by a report of the terminal. In accordance with another exemplary embodiment, the conflict may be directly determined by the macro base station. For example, the occurrence of the conflict may be determined in case that a failure of uplink data reception from the terminal through the resource allocated to the terminal, or a failure of downlink data transmission to the terminal is recognized. Here, the downlink data transmission failure may be recognized by failing to receive a feedback about the downlink data, or receiving a NAK. If the resource conflict does not occur, the macro base station returns to the step 2101 and performs communication with the terminal.

In contrast, if the conflict occurs, the macro base station proceeds to step 2105 and recoordinates resource allocation for the terminal. That is, the macro base station redetermines a cell switching time of the terminal, and redetermines a resource empty on the basis of the cell switching time. For this, the macro base station may exchange necessary information with the small cell base station. The necessary information may include at least one of TA information of the terminal, a resource state of the small cell base station so as to redetermine the cell switching time of the terminal.

After that, the macro base station returns to the step 2101 and performs communication with the terminal. At this time, though not illustrated in the FIG. 21, the macro base station may allocate a resource to the terminal based on the redetermined cell switching time of the terminal, and transmit resource allocation information. The resource allocation information includes information indicating a position and size of a resource allocated to the terminal, and may further include at least one of a resource empty, a CP length, a scheduling type indicator, a monitoring indicator. In case that performing communication with the macro base station and the small cell base station, the terminal may perform cell switching according to cases.

Figure 22:
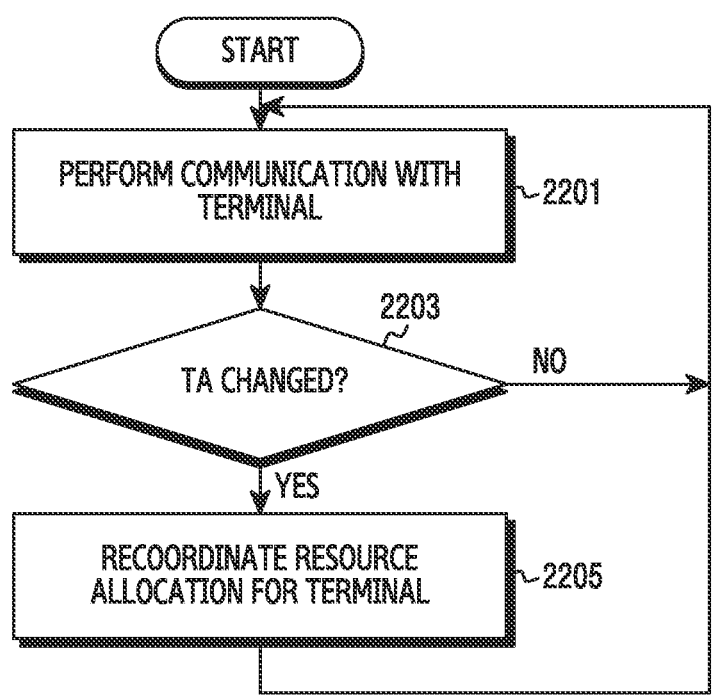
FIG. 22 is a diagram illustrating an operation procedure of a macro base station in a wireless communication system according to a further exemplary embodiment of the present invention.

FIG. 22 illustrates an operation procedure of a macro base station in a wireless communication system according to a further exemplary embodiment of the present invention.

Referring to the FIG. 22, in step 2201, the macro base station performs communication with a terminal. That is, the macro base station allocates a resource to the terminal, and transmits a downlink signal and receives an uplink signal through the allocated resource.

While performing the communication with the terminal, the macro base station proceeds to step 2203 and determines if a TA for the macro base station or a small cell base station of the terminal is changed. The change of the TA may be determined according to a report of the terminal. If the TA is not changed, the macro base station returns to the step 2201 and performs communication with the terminal.

In contrast, if the TA is changed, the macro base station proceeds to step 2205 and recoordinates resource allocation for the terminal. For this, the macro base station exchanges necessary information with the small cell base station. The necessary information may include at least one of changed TA information of the terminal, a resource state of the small cell base station so as to redetermine the cell switching time of the terminal. That is, after acquiring the changed TA information, the macro base station redetermines the cell switching time of the terminal. And, the macro base station recoordinates the resource allocation of the terminal on the basis of the redetermined cell switching time.

After that, the macro base station returns to the step 2201 and performs communication with the terminal. At this time, although not illustrated in the FIG. 22, the macro base station may allocate a resource to the terminal based on the redetermined cell switching time of the terminal, and transmit resource allocation information. The resource allocation information includes information indicating a position and size of the resource allocated to the terminal, and may further include at least one of a resource empty, a CP length, a scheduling type indicator, a monitoring indicator. In case that performing communication with the macro base station and the small cell base station, the terminal may perform cell switching according to cases.

Figure 23:
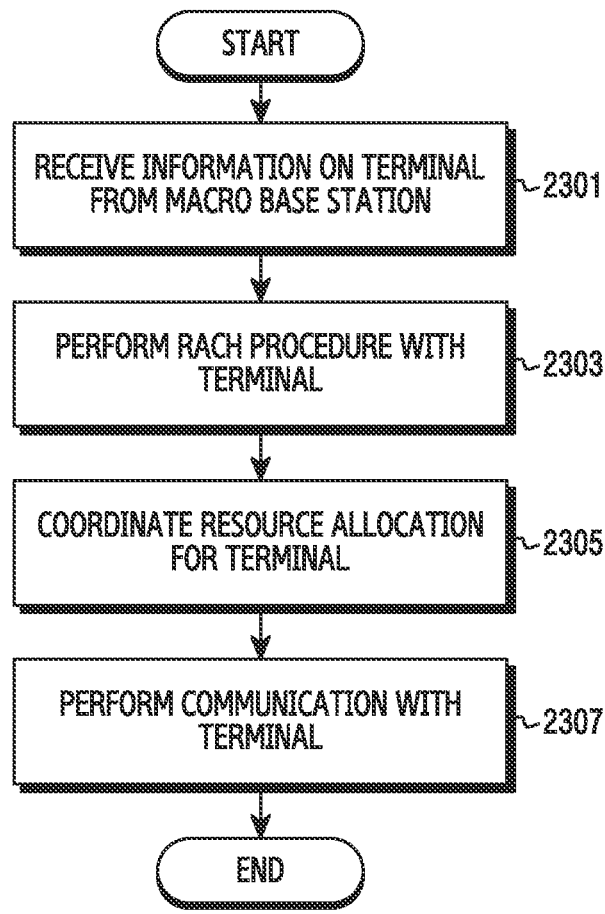
FIG. 23 is a diagram illustrating an operation procedure of a small cell base station in a wireless communication system according to an exemplary embodiment of the present invention.

FIG. 23 illustrates an operation procedure of a small cell base station in a wireless communication system according to an exemplary embodiment of the present invention. The small cell base station may be a network entity belonging to the same system as that of a macro base station, or a network entity belonging to a different system.

Referring to the FIG. 23, in step 2301, the small cell base station receives information on a terminal from the macro base station. The information on the terminal includes at least one of a switching delay time, TA information on the macro base station of the terminal. The TA information may directly or indirectly express, by the unit of time, resource, etc., a difference of time between a time point of transmission in the terminal and a time point of reception in the macro base station. In accordance with another exemplary embodiment of the present invention, the TA information may be received from the terminal, not the macro base station. Also, in accordance with a further exemplary embodiment of the present invention, the switching delay time may be also received from the terminal, not the macro base station. In this case, the switching delay time may be received as a part of capability information of the terminal.

Thereafter, the small cell base station proceeds to step 2303 and performs an RACH procedure with the terminal. Through the RACH procedure, the small cell base station may acquire TA information on the small cell base station of the terminal.

Although not illustrated in the FIG. 23, after performing the RACH procedure, the small cell base station may receive the switching delay time from the terminal. In this case, the switching delay time may not be included in the information on the terminal received in the step 2301. That is, if the switching delay time is included in the information on the terminal received in the step 2301, step of receiving the switching delay time is omitted.

Thereafter, the small cell base station proceeds to step 2305 and coordinates resource allocation for the terminal with the macro base station. For this, the macro base station and the small cell base station may exchange information of a required resource amount, an available resource amount, a position of an actually allocated resource, etc. In detail, the small cell base station determines a cell switching time of the terminal. The cell switching time is determined on the basis of a switching delay time of the terminal and TAs. In accordance with another exemplary embodiment of the present invention, the cell switching time may be determined by the macro base station and then, be provided to the small cell base station. And, the small cell base station determines a resource empty for the terminal. In accordance with another exemplary embodiment of the present invention, the resource empty may be determined by the macro base station and then, be provided to the small cell base station.

Thereafter, the small cell base station proceeds to step 2307 and performs communication with the terminal. At this time, in accordance with a scheduling type, the small cell base station may directly allocate a resource of a small cell, or follow a resource allocation result provided from the macro base station. In case that the resource of the small cell is allocated by the macro base station, the small cell base station may provide information of the small cell base station necessary for scheduling through a backhaul link. And, the small cell base station transmits a downlink signal and receives an uplink signal, through the small cell resource allocated to the terminal.

Although not illustrated in the FIG. 23, in case that a conflict between a resource region of a macro base station allocated to a terminal and a resource region of a small cell base station in course of communication with the terminal is determined, the small cell base station may report the resource conflict of the terminal to the macro base station. For example, in case that failing to normally receive uplink data from the terminal or failing to normally receive a feedback about downlink data transmitted to the terminal, the small cell base station may determine the occurrence of the conflict.

Figure 24:
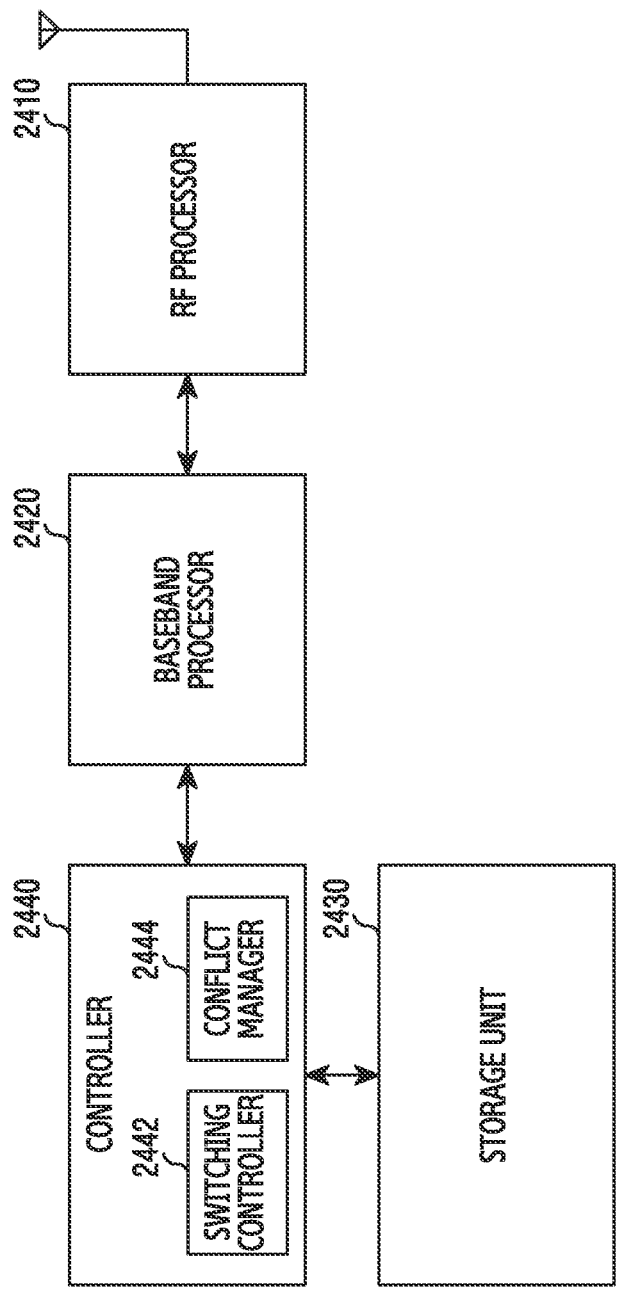
FIG. 24 is a diagram illustrating a block construction of a terminal in a wireless communication system according to an exemplary embodiment of the present invention.

FIG. 24 illustrates a block construction of a terminal in a wireless communication system according to an exemplary embodiment of the present invention.

Referring to the FIG. 24, the terminal includes an RF processor 2410, a baseband processor 2420, a storage unit 2430, and a controller 2440.

The RF processor 2410 performs a function for transmitting/receiving a signal through a wireless channel such as signal band conversion, amplification, etc. That is, the RF processor 2410 up converts a baseband signal provided from the baseband processor 2420 into an RF band signal and then transmits through an antenna, and down converts an RF band signal received through the antenna into a baseband signal. For example, the RF processor 2410 may include a transmission filter, a reception filter, an amplifier, a mixer, an oscillator, a DAC (Digital to Analog Converter), an ADC (Analog to Digital Converter), etc. In the FIG. 24, only one antenna is illustrated, but the terminal may have a plurality of antennas. Also, the RF processor 2410 may include a plurality of RF chains.

The baseband processor 2420 performs a function of conversion between a baseband signal and a bit stream according to the physical layer standard of the system. For example, at data transmission, the baseband processor 2420 creates complex symbols by encoding and modulating a transmission bit stream. Also, at data reception, the baseband processor 2420 restores a reception bit stream through demodulation and decoding of a baseband signal provided from the RF processor 2410. For example, according to an OFDM (Orthogonal Frequency Division Multiplexing) scheme, at data transmission, the baseband processor 2420 creates complex symbols by encoding and modulating a transmission bit stream, and maps the complex symbols to subcarriers, and then constructs OFDM symbols through IFFT (Inverse Fast Fourier Transform) operation and CP insertion. Also, at data reception, the baseband processor 2420 divides a baseband signal provided from the RF processor 2410 by the unit of OFDM symbol, and restores signals mapped to subcarriers through FFT (Fast Fourier Transform) operation, and then restores a reception bit stream through demodulation and decoding. The baseband processor 2420 and the RF processor 2410 transmit and receive a signal as mentioned above. Accordingly to this, the baseband processor 2420 and the RF processor 2410 may be called a transmission unit, a reception unit, or a transmission/reception unit.

The storage unit 2430 stores data of a basic program for an operation of the terminal, an application program, setting information, etc. And, the storage unit 2430 provides the stored data in accordance with a request of the controller 2440.

The controller 2440 controls general operations of the terminal. For example, the controller 2440 transmits/receives a signal through the baseband processor 2420 and the RF processor 2410. In accordance with an exemplary embodiment of the present invention, the controller 2440 includes a switching controller 2442 performing switching between cells, and a conflict manager 2444 recognizing and reporting a conflict between resource regions. For example, the controller 2440 controls the terminal to operate like the terminals illustrated in the FIG. 8 to the FIG. 15, and perform the procedures illustrated in the FIG. 16 to the FIG. 19. An operation of the controller 2440 according to an exemplary embodiment of the present invention is given as follows.

In accordance with one exemplary embodiment of the present invention, the controller 2440 acquires TA information on a macro base station through an RACH procedure with the macro base station and then, transmits a switching delay time of the terminal to the macro base station. Thereafter, if a connectivity to a small cell base station is indicated from the macro base station, the controller 2440 performs a connection procedure with the small cell base station. At this time, the controller 2440 acquires TA information on the small cell base station through the RACH procedure, and transmits the TA information to the macro base station and the small cell base station. However, in accordance with another exemplary embodiment of the present invention, the macro base station and the small cell base station may mutually exchange the TA information and, in this case, the TA information transmission is omitted. And, the controller 2440 reports a switching delay time of the terminal to the small cell base station. However, in accordance with another exemplary embodiment of the present invention, the macro base station may provide switching delay time information of the terminal to the small cell base station. In this case, the report of the switching delay time is omitted. Thereafter, the controller 2440 controls to perform communication with the macro base station and the small cell base station through an allocated resource. At this time, the resource allocation information may be received from each of the macro base station and the small cell base station, or be received from the macro base station only.

In accordance with another exemplary embodiment of the present invention, while performing communication with a macro base station and a small cell base station, the controller 2440 determines if a conflict between resource regions of the macro base station and the small cell base station allocated to the terminal occurs. For example, the controller 2440 recognizes a failure of uplink data transmission or compares a resource empty and an actually allocated resource, thereby being capable of detecting the conflict. In case that the conflict occurs, the controller 2440 reports, to the macro base station, the occurrence of the conflict. For example, the controller 2440 transmits a separate message, signal sequence defined for the conflict report.

In accordance with a further exemplary embodiment of the present invention, while performing communication with a macro base station and a small cell base station, the controller 2440 determines if a TA for the macro base station or the small cell base station is changed. The TA may be changed as a distance with the macro base station or small cell base station is changed according to movement of the terminal. If the TA for the macro base station or small cell base station is changed, the controller 2440 transmits the changed TA information to a corresponding base station. The changed TA information may express the changed TA itself, or express a difference value with previous TA. However, in accordance with another exemplary embodiment of the present invention, although the TA is changed, the controller 2440 may not transmit the changed TA information. In this case, the changed TA information may be directly exchanged between the macro base station and the small cell base station.

In accordance with a yet another exemplary embodiment of the present invention, the controller 2440 receives a monitoring related indicator. The indicator may indicate at least one of need or non-need of cell switching for monitoring, a scheduling type. The scheduling type represents whether one base station transmits resource allocation information of a plurality of cells, or whether base stations each transmit. The indicator may be received together with resource allocation information.

After receiving the indicator, the controller 2440 determines execution or non-execution of cell switching for resource allocation information monitoring. For example, in case that the indicator indicates that a macro base station transmits resource allocation information of a plurality of cells, the controller 2440 monitors resource allocation information of the macro base station, and determines to exclude the cell switching. For another example, in case that the indicator indicates that base stations each transmit the resource allocation information of the plurality of cells, the controller 2440 determines to perform cell switching in order to monitor resource allocation information transmitted by each of the base stations. At this time, the controller 2440 may perform the cell switching in accordance with an indicator indicating that there is a need for the cell switching. That is, if the indicator indicates that there is not the need for the cell switching, the controller 2440 may exclude the cell switching, although a resource allocation information transmission time point of other base station arrives.

Figure 25:
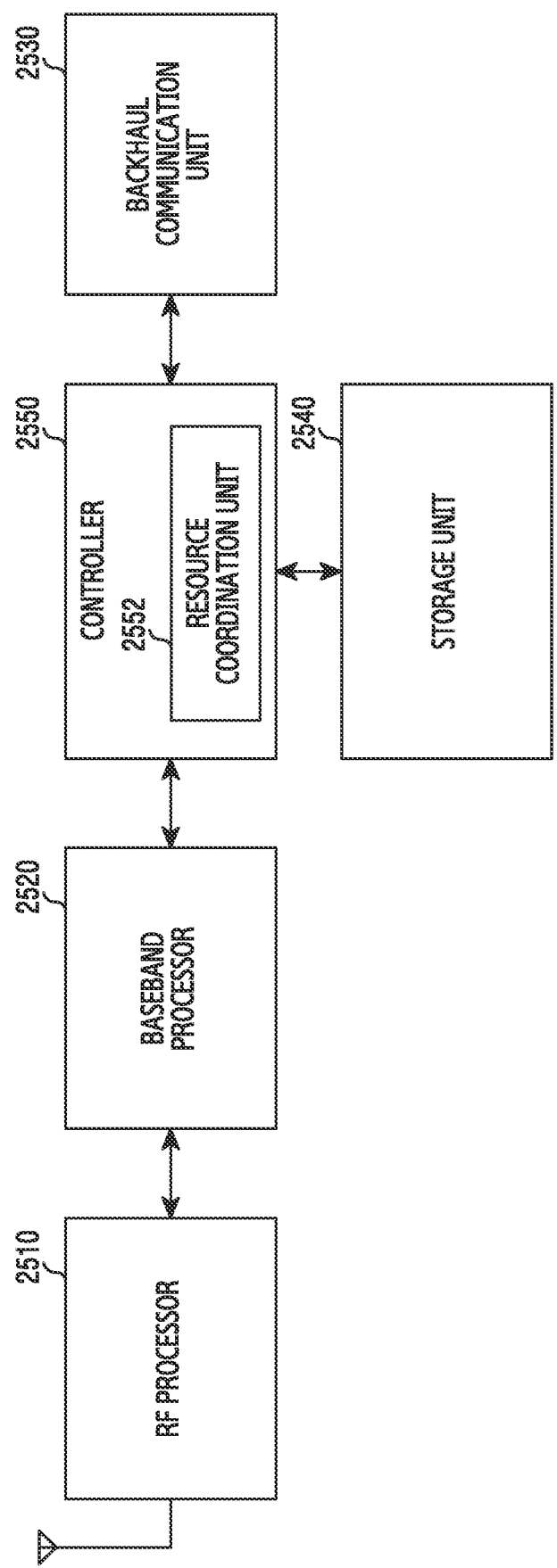
FIG. 25 is a diagram illustrating a block construction of a base station in a wireless communication system according to an exemplary embodiment of the present invention.

FIG. 25 illustrates a block construction of a base station in a wireless communication system according to an exemplary embodiment of the present invention.

Referring to the FIG. 25, the base station includes an RF processor 2510, a baseband processor 2520, a backhaul communication unit 2530, a storage unit 2540, and a controller 2550.

The RF processor 2510 performs a function for transmitting/receiving a signal through a wireless channel such as signal band conversion, amplification, etc. That is, the RF processor 2510 up converts a baseband signal provided from the baseband processor 2520 into an RF band signal and then transmits through an antenna, and down converts an RF band signal received through the antenna into a baseband signal. The RF processor 2510 includes RF chains for each of a plurality of antennas, and each RF chain may include a transmission filter, a reception filter, an amplifier, a mixer, an oscillator, a DAC, an ADC, etc.

The baseband processor 2520 performs a function of conversion between a baseband signal and a bit stream according to the physical layer standard of the system. For example, according to an OFDM scheme, at data transmission, the baseband processor 2520 creates complex symbols by encoding and modulating a transmission bit stream, and maps the complex symbols to subcarriers, and then constructs OFDM symbols through IFFT operation and CP insertion. Also, at data reception, the baseband processor 2520 divides a baseband signal provided from the RF processor 2510 by the unit of OFDM symbol, and restores signals mapped to subcarriers through FFT operation, and then restores a reception bit stream through demodulation and decoding. The baseband processor 2520 and the RF processor 2510 transmit and receive a signal as mentioned above. Accordingly to this, the baseband processor 2520 and the RF processor 2510 may be called a transmission unit, a reception unit, or a transmission/reception unit.

The backhaul communication unit 2530 provides an interface for performing communication with other nodes within a network such as other base stations, etc. That is, the backhaul communication unit 2530 converts, into a physical signal, a bit stream transmitted from the base station to other node, for example, other base station, a core network, etc., and converts a physical signal received from the other node into a bit stream. The storage unit 2540 stores data of a basic program for an operation of the base station, an application program, setting information, etc. And, the storage unit 2540 provides the stored data in accordance with a request of the controller 2550.

The controller 2550 controls general operations of the base station. For example, the controller 2550 transmits/receives a signal through the baseband processor 2520 or the RF processor 2510 or through the backhaul communication unit 2530. Also, the controller 2550 records data in the storage unit 2540, and reads. In accordance with an exemplary embodiment of the present invention, the controller 2550 includes a resource coordination unit 2552 coordinating resource allocation for the terminal such as determining a cell switching time of the terminal, determining a resource empty on the basis of the cell switching time, etc. For example, the controller 2550 controls the base station to operate like the macro base station or the small cell base station illustrated in the FIG. 8 to the FIG. 15, and perform the procedures illustrated in the FIG. 20 to the FIG. 23. An operation of the controller 2550 according to an exemplary embodiment of the present invention is given as follows.

First, a description is made for a case in which the base station is a macro base station.

Referring to the FIG. 20, the controller 2550 acquires TA information of a terminal through an RACH procedure with the terminal which performs an initial entry procedure, and receives switching delay time information of the terminal from the terminal. If it is determined to service the terminal together with a small cell base station, the controller 2550 provides, to the small cell base station, a switching delay time of the terminal and TA information on the macro base station of the terminal. However, in accordance with another exemplary embodiment of the present invention, the TA information on the macro base station may be provided to the small cell base station by the terminal and, in this case, the provision of the TA information between the base stations is omitted. Thereafter, the controller 2550 receives TA information on the small cell base station of the terminal. In accordance with an exemplary embodiment of the present invention, the TA information on the small cell base station may be provided from the small cell base station. Next, the controller 2550 coordinates resource allocation for the terminal with the small cell base station. For this, the macro base station and the small cell base station may exchange information of a required resource amount, an available resource amount, a position of an actually allocated resource, etc. In detail, the controller 2550 determines a cell switching time of the terminal, and determines a resource empty for the terminal. Thereafter, the controller 2550 allocates a resource to the terminal, and transmits resource allocation information. At this time, in accordance with a scheduling type, the controller 2550 may allocate only a resource of a macro cell, or allocate all of the resource of the macro cell and a resource of a small cell. In case that allocating even the resource of the small cell, the controller 2550 may collect information of the small cell base station necessary for scheduling through a backhaul link.

In accordance with another exemplary embodiment of the present invention, while performing communication with the terminal, the controller 2550 determines if a conflict between resource regions of the macro base station and small cell base station allocated to the terminal occurs. The occurrence or non-occurrence of the conflict may be determined by a report of the terminal. In accordance with another exemplary embodiment, the conflict may be directly determined by the macro base station. If the conflict occurs, the controller 2550 recoordinates resource allocation for the terminal. That is, the controller 2550 redetermines a cell switching time of the terminal, and redetermines a resource empty on the basis of the cell switching time. For this, the controller 2550 may exchange necessary information with the small cell base station. The necessary information may include at least one of TA information of the terminal, a resource state of the small cell base station so as to redetermine the cell switching time of the terminal.

In accordance with a further exemplary embodiment of the present invention, while performing communication with the terminal, the controller 2550 determines if a TA for the macro base station or small cell base station of the terminal is changed. The change of the TA may be determined according to a report of the terminal. If the TA is changed, the controller 2550 recoordinates resource allocation for the terminal. For this, the controller 2550 exchanges necessary information with the small cell base station. The necessary information may include at least one of changed TA information of the terminal, a resource state of the small cell base station so as to redetermine the cell switching time of the terminal. That is, after acquiring the changed TA information, the controller 2550 redetermines a cell switching time of the terminal. And, the controller 2550 recoordinates resource allocation of the terminal on the basis of the redetermined cell switching time.

Next, a description is made for a case in which the base station is a small cell base station.

In accordance with an exemplary embodiment of the present invention, the controller 2550 receives information on a terminal, for example, at least one of a switching delay time of the terminal, TA information on a macro base station of the terminal from the macro base station. In accordance with another exemplary embodiment of the present invention, the TA information may be received from the terminal, not the macro base station. Also, in accordance with a further exemplary embodiment of the present invention, the switching delay time may be also received from the terminal, not the macro base station. Thereafter, the controller 2550 performs an RACH procedure with the terminal and, through the RACH procedure, the controller 2550 acquires TA information on the small cell base station of the terminal. Thereafter, the controller 2550 coordinates resource allocation for the terminal with the macro base station. For this, the macro base station and the controller 2550 may exchange information of a required resource amount, an available resource amount, a position of an actually allocated resource, etc. Thereafter, the controller 2550 controls to perform communication with the terminal. At this time, in accordance with a scheduling type, the controller 2550 may directly allocate a resource of a small cell, or follow a resource allocation result provided from the macro base station. In case that the resource of the small cell is allocated by the macro base station, the controller 2550 may provide information of the small cell base station necessary for scheduling through a backhaul link. And, the controller 2550 transmits a downlink signal and receives an uplink signal, through the small cell resource allocated to the terminal.

In accordance with another exemplary embodiment of the present invention, in case that a conflict between a resource region of a macro base station allocated to a terminal and a resource region of a small cell base station in course of communication with the terminal is determined, the controller 2550 may report the resource conflict of the terminal to the macro base station through the backhaul communication unit 2540.

The aforementioned exemplary embodiments of the present invention make empty some resources of a macro base station or a small cell base station on the basis of a cell switching time of a terminal. In accordance with another exemplary embodiment of the present invention, the macro base station and the small cell base station may apply different CP lengths on the basis of the cell switching time of the terminal. For example, in case that the cell switching time determined on the basis of a switching delay time of the terminal and TAs gets out of a CP length generally applying in a system, a CP having a length equal to or greater than the cell switching time of the terminal may be applied. At this time, the terminal may indicate to use other CP lengths.

Methods according to exemplary embodiments mentioned in claims and/or specification of the present invention may be implemented in a form of hardware, software, or a combination of the hardware and the software.

If the methods are implemented by the software, a computer-readable storage medium storing one or more programs (software modules) may be provided. The one or more programs stored in the computer-readable storage medium are configured to be executed by one or more processors within an electronic device. The one or more programs may include instructions for enabling the electronic device to execute the methods according to the exemplary embodiments stated in the claims and/or specification of the present invention.

These programs (software modules, software) may be stored in a random access memory, a non-volatile memory including a flash memory, a ROM (Read Only Memory), an EEPROM (Electrically Erasable Programmable Read Only Memory), a magnetic disc storage device, a CD-ROM (Compact Disc-ROM), DVDs (Digital Versatile Discs) or an optical storage device of other form, and a magnetic cassette. Or, they may be stored in a memory constructed by a combination of some or all of them. Also, each constructed memory may be included in plural as well.

Also, the programs may be stored in an attachable storage device accessible through a communication network such as the Internet, an intranet, a LAN (Local Area Network), a WLAN (Wide LAN), or a SAN (Storage Area Network) or a communication network constructed by a combination of them. This storage device may connect to a device performing an exemplary embodiment of the present invention through an external port. Also, a separate storage device on the communication network may connect to a device performing an exemplary embodiment of the present invention.

In the aforementioned concrete exemplary embodiments of the present invention, a constituent element included in the invention has been expressed in the singular number or the plural number in accordance with the proposed concrete exemplary embodiments. But, the expression of the singular number or plural number is selected suitable to a situation proposed for description's convenience, and the present invention is not limited to singular or plural constituent elements. Even the constituent element expressed in the plural number may be constructed in the singular number, or even the constituent element expressed in the singular number may be constructed in the plural number.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method performed by a terminal in a wireless communication system, the method comprising:
    establishing dual connectivity with a first cell and a second cell;
    transmitting, to at least one of the first cell or the second cell, a capability information of the terminal, wherein the capability information includes information on a switching delay time required for uplink switching between the first cell and the second cell;
    receiving, from the at least one of the first cell or the second cell, an uplink resource allocation information based on the information on the switching delay time, resources of the first cell and resources of the second cell, wherein the resources of the first cell and the resources of the second cell are allocated on time axis; and
    performing an uplink communication with the at least one of the first cell or the second cell based on the uplink resource allocation information.

2. The method of claim 1,
    wherein the first cell is provided by a first base station (BS), and the second cell is provided by a second BS.

3. The method of claim 1,
wherein the first cell supports a first radio access technology (RAT), and the second cell supports a second RAT that is different from the first RAT.

4. The method of claim 1, further comprising:
if a conflict between the resources of the first cell and the resources of the second cell occurs, reporting an occurrence of the conflict to the first cell,
wherein the uplink resource allocation information comprises monitoring information indicating whether the uplink switching is needed for a resource allocation.

5. The method of claim 1, wherein the performing the uplink communication comprises:
transmitting, to the first cell, a first uplink signal including a cyclic prefix (CP);
performing the uplink switching from the first cell to the second cell;
transmitting, to the second cell, a second uplink signal including the CP; and
if a timing advance (TA) for the first cell or a TA for the second cell is changed, transmitting the changed TA to the first cell.

6. The method of claim 1, wherein the performing the uplink communication comprises:
performing the uplink communication with the at least one of the first cell or the second cell by using a signal including a cyclic prefix (CP), and
wherein the length of the CP is determined based on the capability information of the terminal and is longer than a length of an uplink switching time.

7. A method performed by a first cell in a wireless communication system, the method comprising:
establishing dual connectivity with a terminal and a second cell;
receiving, from the terminal, a capability information of the terminal, wherein the capability information includes information on a switching delay time required for uplink switching between the first cell and the second cell;
transmitting, to the terminal, an uplink resource allocation information based on the information on the switching delay time, resources of the first cell and resources of the second cell, wherein the resources of the first cell and the resources of the second cell are allocated on time axis; and
performing an uplink communication with the terminal based on the uplink resource allocation information.

8. The method of claim 7,
wherein the first cell is provided by a first base station (BS), and the second cell is provided by a second BS.

9. The method of claim 7,
wherein the first cell supports a first radio access technology (RAT), and the second cell supports a second RAT that is different from the first RAT.

10. The method of claim 7, further comprising:
receiving a timing advance (TA) for the second cell from at least one of the terminal or the second cell;
determining an uplink switching time of the terminal based on at least one of the switching delay time or the TA of the terminal; and
determining a resource to make empty such that a length of the empty resource is equal to or greater than the uplink switching time between the first cell and the second cell.

11. The method of claim 7, wherein the performing the uplink communication comprises:
transmitting, to the terminal, information indicating a type of scheduling for the terminal,
wherein the type of scheduling indicates whether a resource of the second cell is allocated by the first cell.

12. The method of claim 7, wherein the performing the uplink communication comprises:
performing the uplink communication with the terminal by using a signal including a cyclic prefix (CP), and
wherein the length of the CP is determined based on the capability information of the terminal and is longer than a length of an uplink switching time.

13. A terminal in a wireless communication system, the terminal comprising:
at least one transceiver; and
at least one processor operably coupled with the at least one transceiver, the at least one processor configured to:
establish dual connectivity with a first cell and a second cell,
transmit, to at least one of the first cell or the second cell, a capability information of the terminal, wherein the capability information includes information on a switching delay time required for uplink switching between the first cell and the second cell,
receive, from the at least one of the first cell or the second cell, an uplink resource allocation information based on the information on the switching delay time, resources of the first cell and resources of the second cell, wherein the resources of the first cell and the resources of the second cell are allocated on time axis, and
perform an uplink communication with the at least one of the first cell or the second cell based on the uplink resource allocation information.

14. The terminal of claim 13,
wherein the first cell is provided by a first base station (BS), and the second cell is provided by a second BS.

15. The terminal of claim 13,
wherein the first cell supports a first radio access technology (RAT), and the second cell supports a second RAT that is different from the first RAT.

16. The terminal of claim 13, the at least one processor further configured to:
if a conflict between the resources of the first cell and the resources of the second cell occurs, report an occurrence of the conflict to the first cell,
wherein the uplink resource allocation information comprises monitoring information indicating whether the uplink switching is needed for a resource allocation.

17. The terminal of claim 13, the at least one processor further configured to:
transmit, to the first cell, a first uplink signal including a cyclic prefix (CP);
perform the uplink switching from the first cell to the second cell;
transmit, to the second cell, a second uplink signal including the CP; and
if a timing advance (TA) for the first cell or a TA for the second cell is changed, transmitting the changed TA to the first cell.

18. The terminal of claim 13, the at least one processor further configured to:
perform the uplink communication with the at least one of the first cell or the second cell by using a signal including a cyclic prefix (CP), and wherein the length of the CP is determined based on the capability information of the terminal and is longer than a length of an uplink switching time.

19. A first cell in a wireless communication system, the first cell comprising:
- at least one transceiver; and
- at least one processor operably coupled with the at least one transceiver, the at least one processor configured to:
- establish dual connectivity with a terminal and a second cell,
- receive, from the terminal, a capability information of the terminal, wherein the capability information includes information on a switching delay time required for uplink switching between the first cell and the second cell,
- transmit, to the terminal, an uplink resource allocation information based on the information on the switching delay time, resources of the first cell and resources of the second cell, wherein the resources of the first cell and the resources of the second cell are allocated on time axis, and
- perform an uplink communication with the terminal based on the uplink resource allocation information.

20. The first cell of claim 19, wherein the first cell is provided by a first base station (BS), and the second cell is provided by a second BS.

* * * * *